(12) United States Patent
Shpak et al.

(10) Patent No.: US 11,892,640 B1
(45) Date of Patent: Feb. 6, 2024

(54) WAVEGUIDE COMBINER WITH STACKED PLATES

(71) Applicant: Microsoft Technology Licensing, LLC, Redmond, WA (US)

(72) Inventors: Maksim Shpak, Vantaa (FI); Tapani Matias Alasaarela, Espoo (FI); Joona Koponen, Vantaa (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/180,076

(22) Filed: Mar. 7, 2023

(51) Int. Cl.
*G02B 27/01* (2006.01)
*G02B 27/09* (2006.01)
*G02B 27/00* (2006.01)

(52) U.S. Cl.
CPC ..... *G02B 27/0172* (2013.01); *G02B 27/0081* (2013.01); *G02B 27/0103* (2013.01); *G02B 27/0972* (2013.01)

(58) Field of Classification Search
CPC .................................................. G02B 27/0172
See application file for complete search history.

(56) References Cited

U.S. PATENT DOCUMENTS

2020/0409156 A1    12/2020  Sissom et al.

FOREIGN PATENT DOCUMENTS

CN    112346246 B    9/2021

OTHER PUBLICATIONS

Xiong, et al., "Augmented Reality and Virtual Reality Displays: Emerging Technologies and Future Perspectives", In Journal of Light: Science & Applications, vol. 10, No. 1, Oct. 25, 2021, 30 Pages.

*Primary Examiner* — Gustavo Polo
(74) *Attorney, Agent, or Firm* — Mark K. Young PC; Mark K. Young

(57) ABSTRACT

Disclosed are a mixed-reality optical waveguide-based combiner apparatus that includes stacked plates of reflective optical elements (ROEs) and associated methods of fabrication. ROEs in the plates of the waveguide combiner share a commonly shaped and sized footprint and are aligned in the stack. A top plate in the stack of plates includes an input-coupler, such as a prism, for in-coupling light for virtual images from a display engine into the waveguide combiner. The top plate also includes a top ROE comprising a cascaded array of mirror elements in a waveguide that horizontally expands an exit pupil of the virtual images and couples the light to a corresponding bottom ROE, disposed in a bottom plate in the stack, comprising a cascaded array of mirror elements in a waveguide. The bottom ROE couples the virtual image light to an output coupler in the bottom plate which out-couples light from the waveguide combiner.

20 Claims, 22 Drawing Sheets

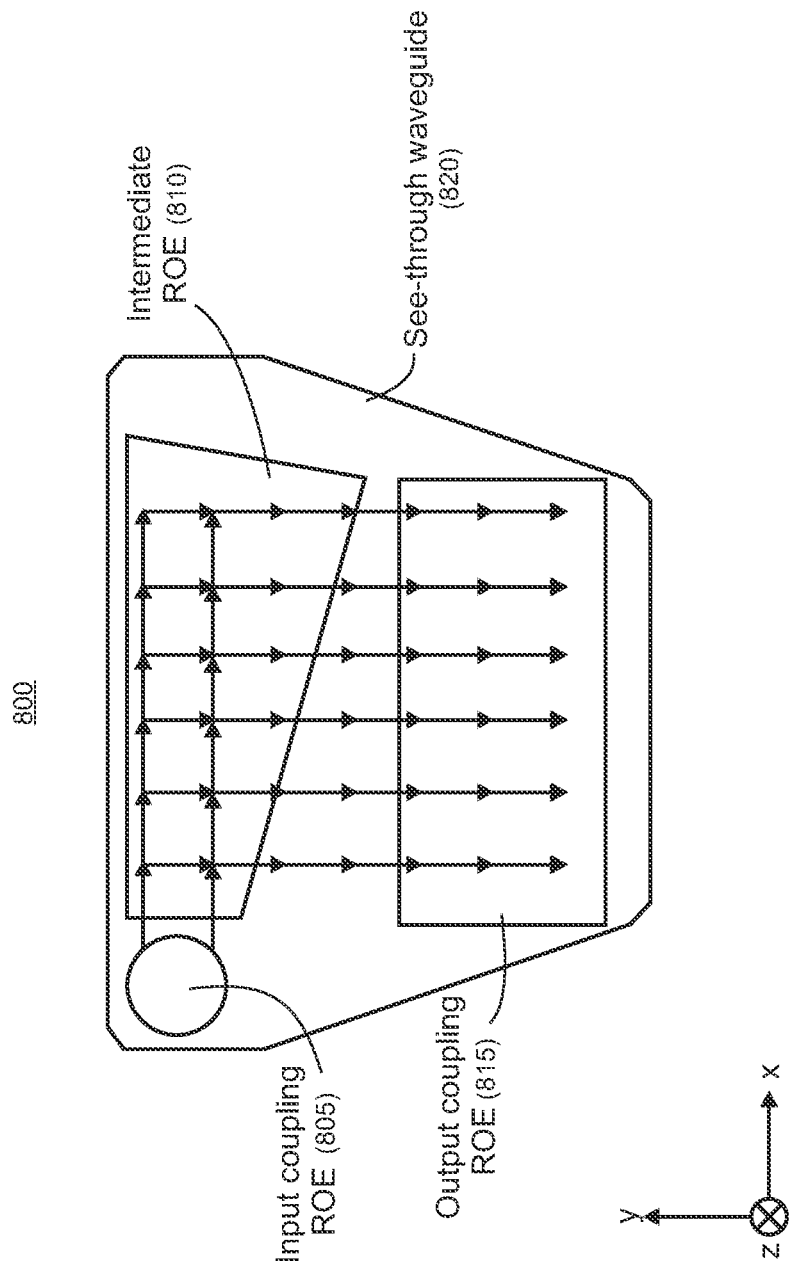

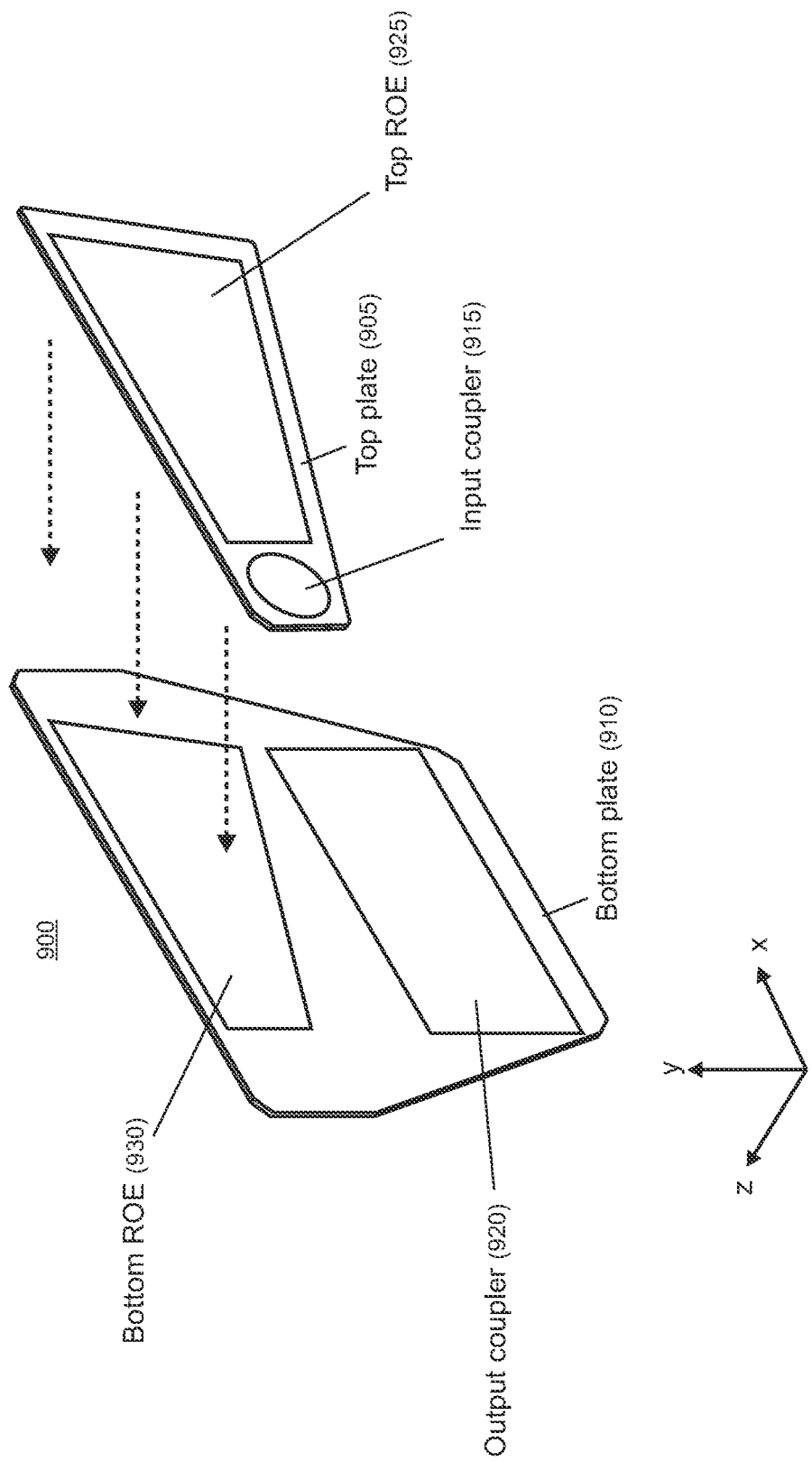

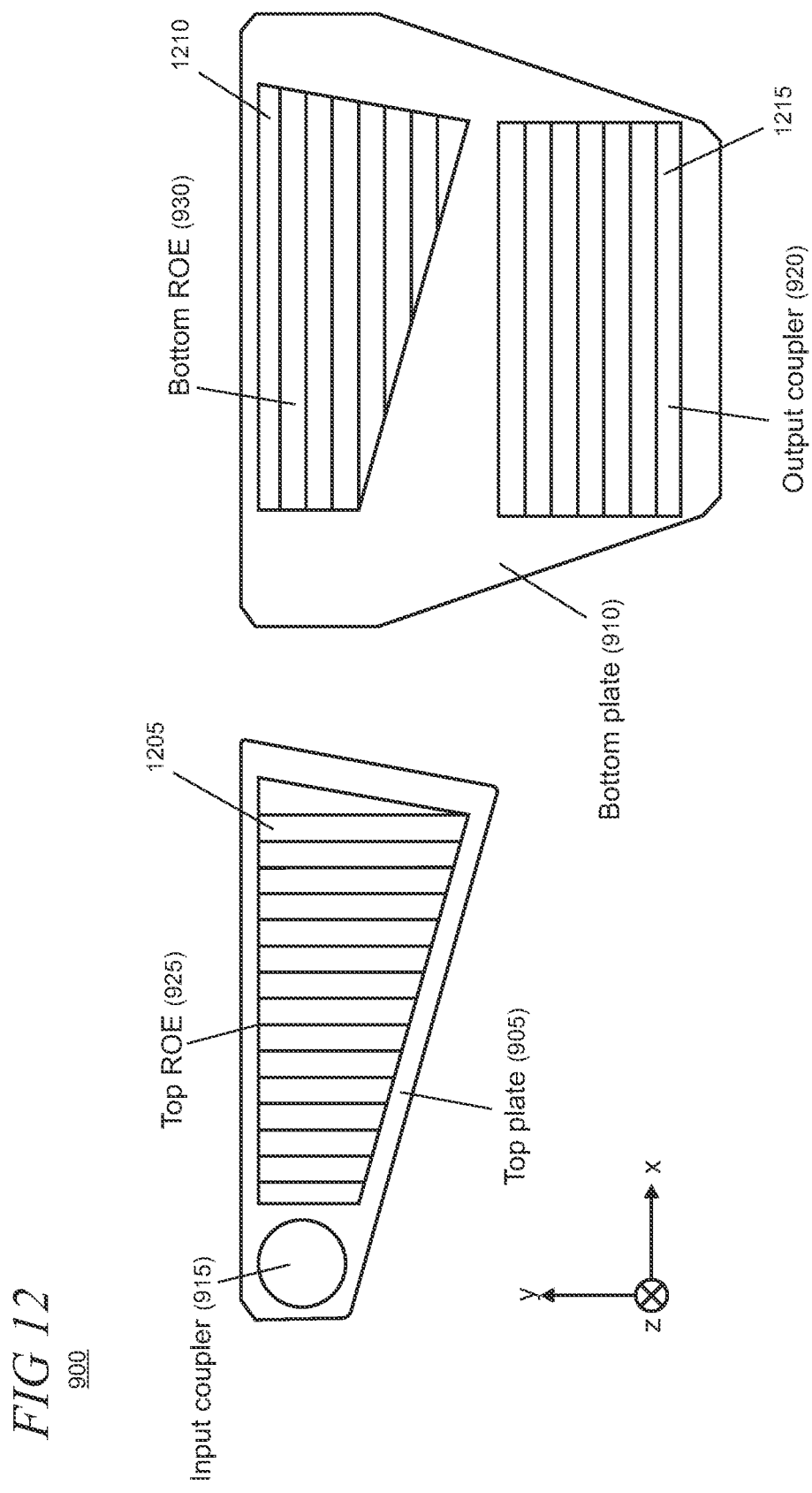

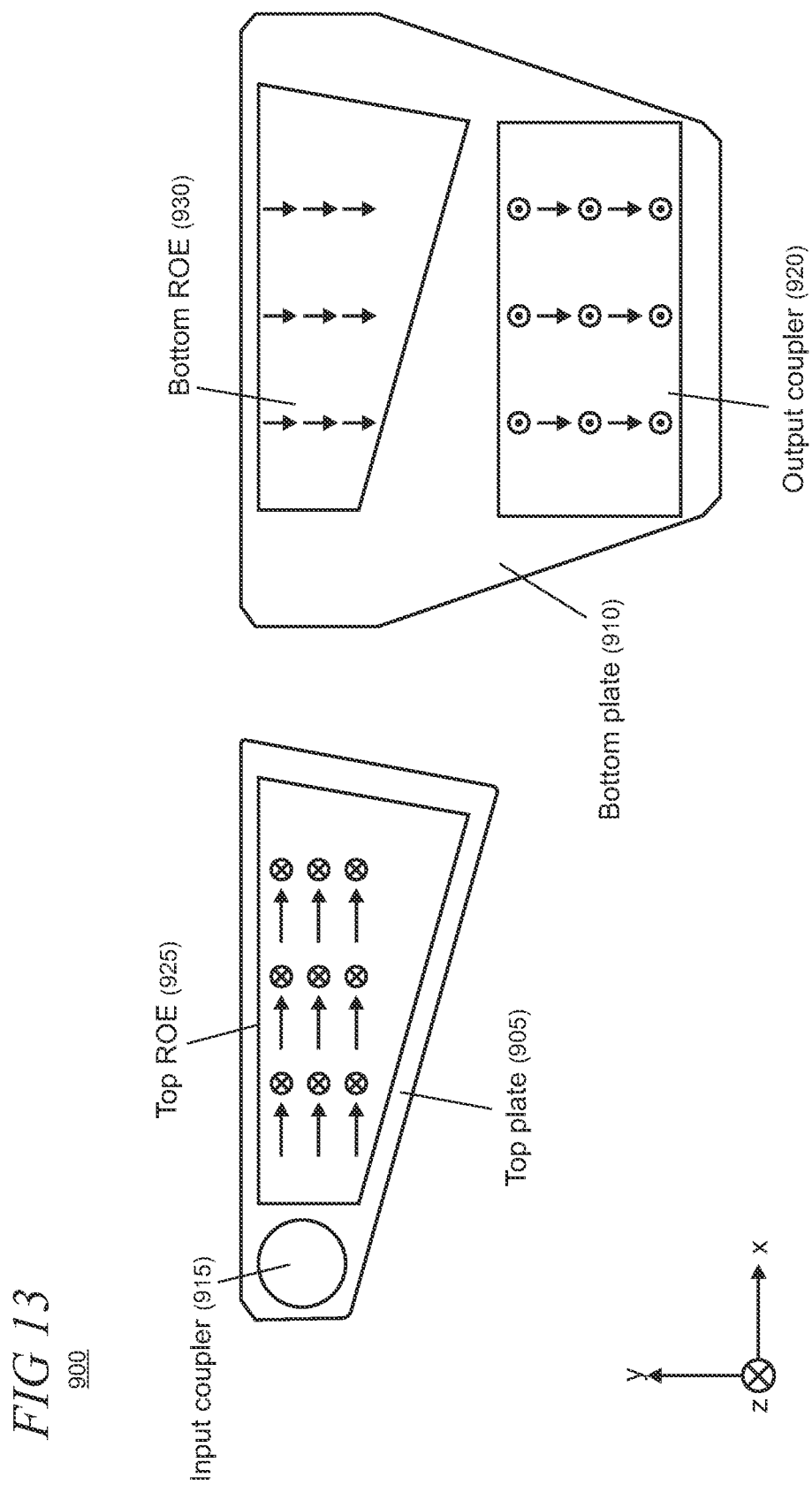

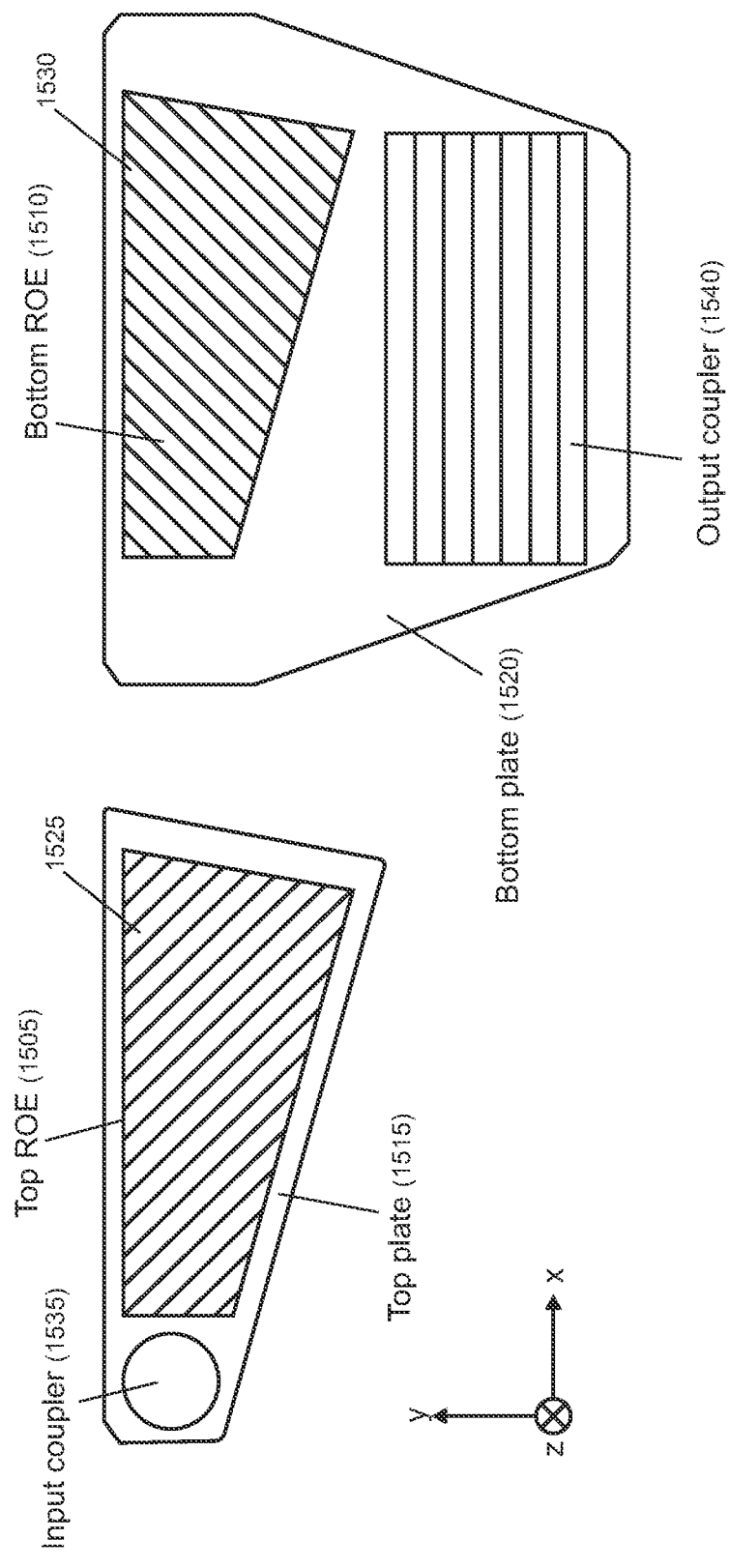

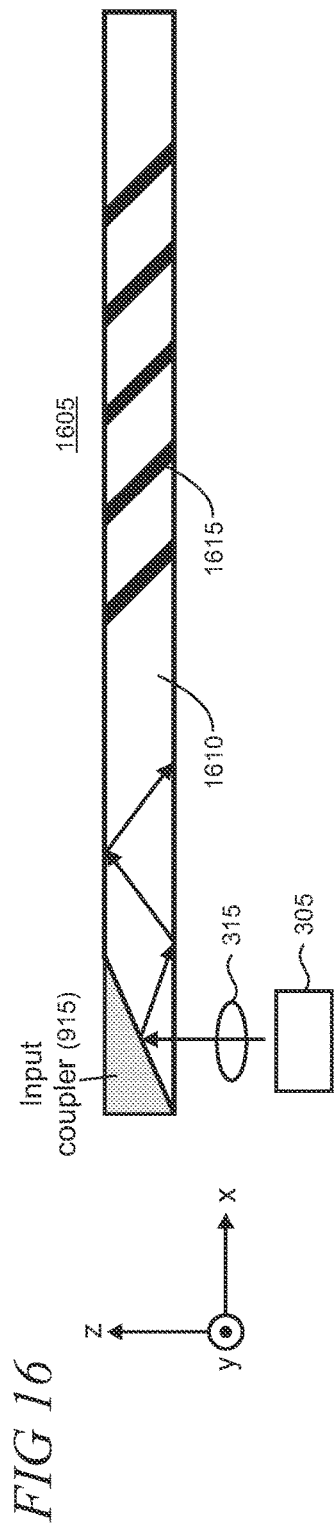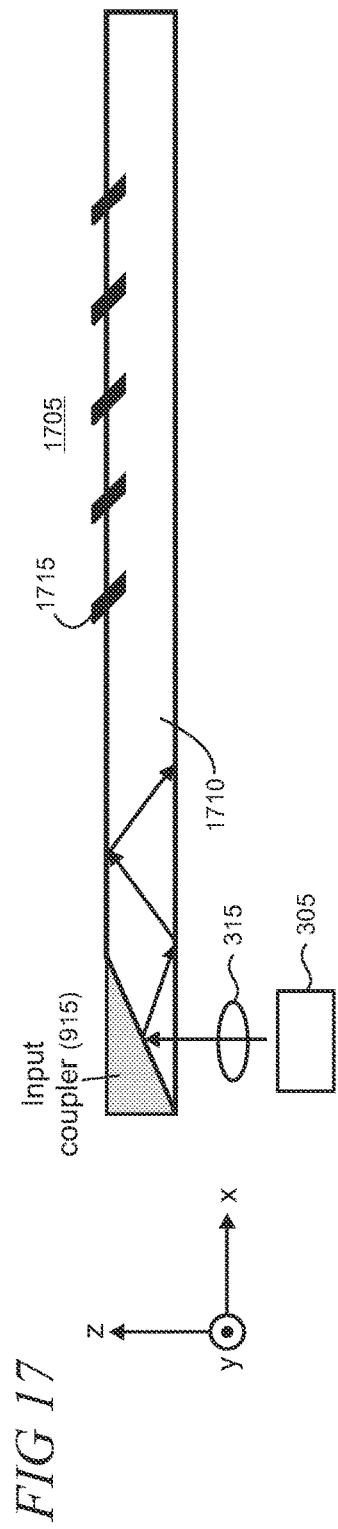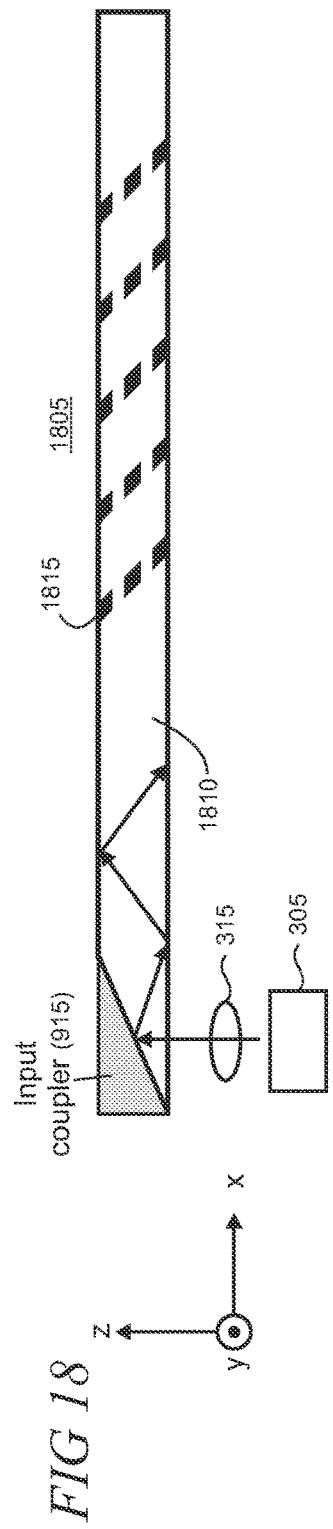

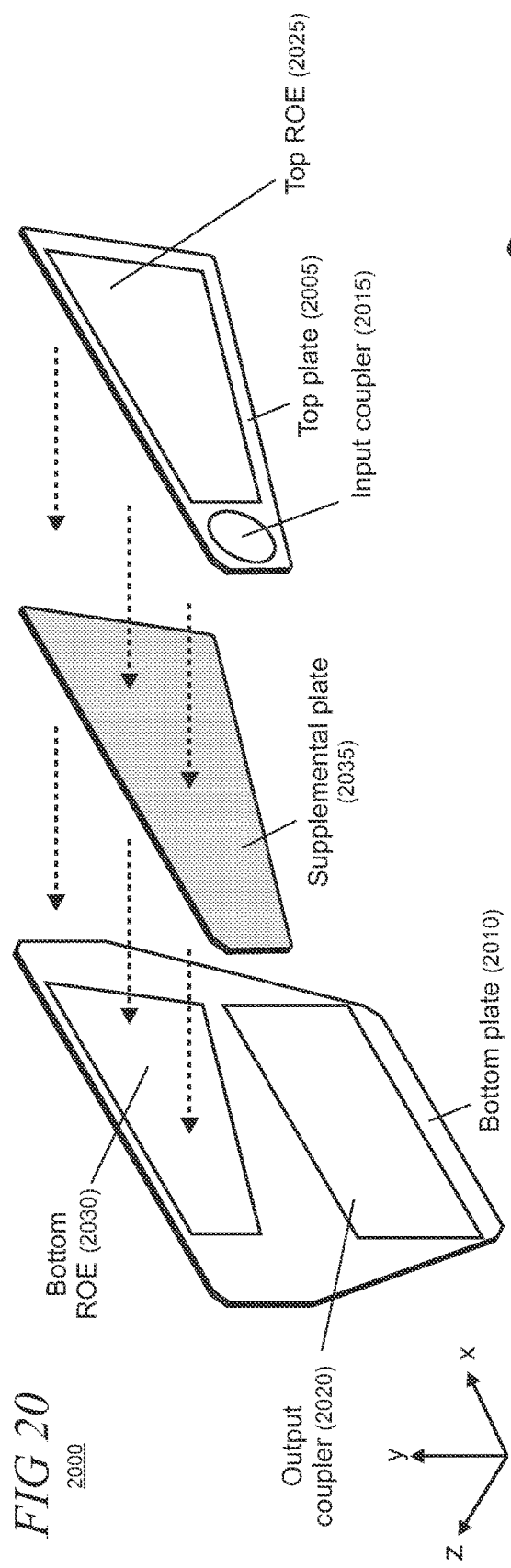

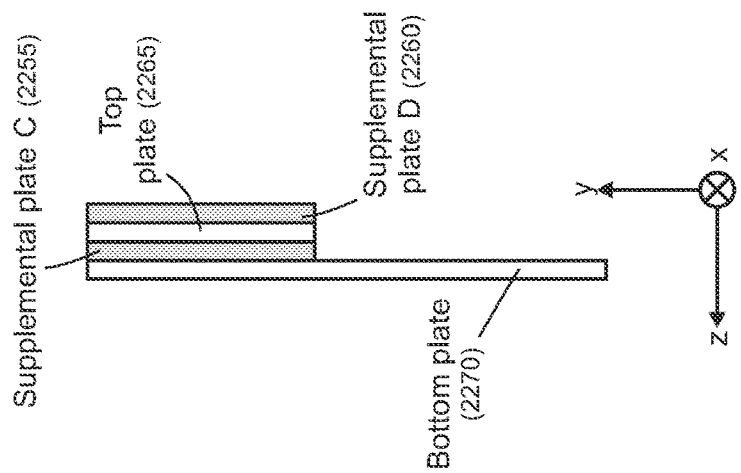
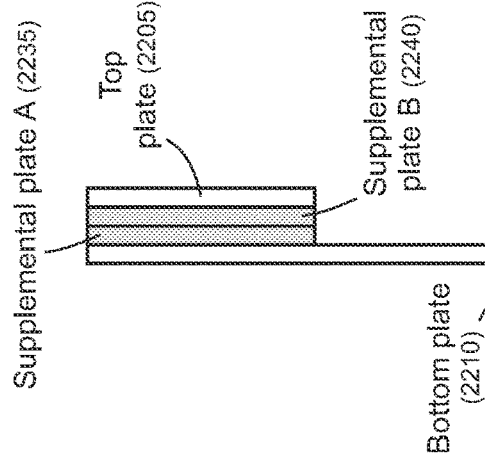
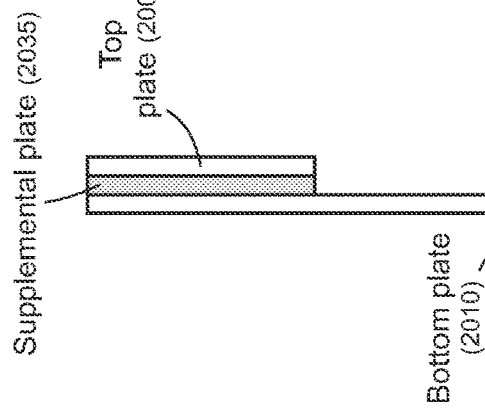

FIG 23
2300

| Supplemental optical element (2305) | Feature/function (2310) |
|---|---|
| Polarizing filter | Coupling with increased efficiency between top and bottom plates |
| Spectral filter | Increased display color uniformity/accuracy |
| Refractive/diffractive/volume holographic elements (static or switchable) | Increased angular bandwidth (FOV) |
| Metasurfaces | Increased eyebox size |
| Prism/micro-prism array | Coupling with increased efficiency between top and bottom plates |
| Microlens array (MLA) (static and/or dynamically tunable) | Variable focus for virtual images |
|  | Vision correction for HMD device users |
|  | Pupil steering for increased eyebox size/uniformity |
| Resonant waveguide grating (RWG) | Coupling between top and bottom plates |
|  | Focus, filtering, field enhancements |
|  | Non-linear effects |
| Microelectromechanical systems (MEMS) | Dynamic beam steering |
| Illumination sources | Provide illumination within the FOV for eye tracking |

2400

WAVEGUIDE COMBINER WITH STACKED PLATES

BACKGROUND

Mixed-reality computing devices, such as head-mounted display (HMD) devices and handheld mobile devices (e.g., smart phones, tablet computers, etc.), are typically configurable to display information to a user about virtual images, and/or images of real objects in a field of view (FOV) of the user and/or a FOV of a camera of the device. For example, some HMD devices are configured to display, using a see-through display system, virtual environments with real-world objects mixed in, or real-world environments with virtual objects mixed in.

SUMMARY

Disclosed are an optical waveguide-based combiner apparatus that includes stacked plates of reflective optical elements (ROEs) and associated methods of fabrication. The waveguide combiner is configured for use in a mixed-reality display system that combines virtual and real-world images. ROEs in each of the plates of the waveguide combiner share a commonly shaped and sized footprint and are aligned in the stack. A top plate in the stack of plates includes an input coupler, such as a prism, for in-coupling light for virtual images from a display engine into the waveguide combiner. The top plate also includes a top ROE comprising a cascaded array of mirror elements in a waveguide that horizontally expands an exit pupil of the virtual images and couples the light to a corresponding bottom ROE disposed in a bottom plate in the stack.

The bottom ROE in the bottom plate has a cascaded array of mirror elements in a waveguide that receives the virtual image light from the top ROE in the top plate and couples it to an out-coupling ROE that is commonly disposed in the bottom plate with the bottom ROE. The out-coupling ROE comprises a cascaded array of mirror elements in a waveguide that vertically expands the exit pupil and out-couples the virtual light to a user of the display system with an expanded exit pupil in two directions (i.e., horizontally and vertically) compared to an entrance pupil to the waveguide combiner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 8 shows an illustrative conventional arrangement of reflective optical elements (ROEs) configured for in-coupling, exit pupil expansion in two directions, and out-coupling;

FIG. 9 shows an exploded pictorial view of an illustrative waveguide combiner using ROEs arranged in stacked top and bottom plates;

FIG. 12 shows a first illustrative embodiment of mirror elements in the ROEs in the top and bottom plates;

FIG. 13 shows a front view of illustrative propagation paths for virtual image light in the ROEs in the top and bottom plates (shown disassembled for clarity in exposition);

FIG. 15 shows a second illustrative embodiment of mirror elements in the ROEs in the top and bottom plates;

FIG. 16 is a top view of a first illustrative embodiment of a top ROE using a concatenated array of mirror elements that are embedded in a planar waveguide;

FIG. 17 is a top view of a second illustrative embodiment of a top ROE using a concatenated array of mirror elements that are partially embedded in a planar waveguide;

FIG. 18 is a top view of a third illustrative embodiment of a top ROE using a concatenated array of fractured mirror elements that are embedded in a planar waveguide;

FIG. 20 shows an exploded pictorial view of an illustrative waveguide combiner having ROEs arranged in stacked top and bottom plates in which a supplemental plate is disposed between the top and bottom plates;

FIG. 21 shows a pictorial view of an illustrative waveguide combiner, as assembled, having ROEs arranged in stacked top and bottom plates in which a supplemental plate is disposed between the top and bottom plates;

FIGS. 22A, B, and C show respective side views of alternative illustrative embodiments of waveguide combiners, as assembled, having ROEs arranged in stacked top and bottom plates, in which one or more supplemental plates are disposed between the top and bottom plates, or interleaved with the top and bottom plates;

FIG. 23 shows a table 2300 providing illustrative examples of optical elements that are usable in one or more supplemental plates to implement various features and/or functions;

Like reference numerals indicate like elements in the drawings. Elements are not drawn to scale.

DETAILED DESCRIPTION

Figure 1:
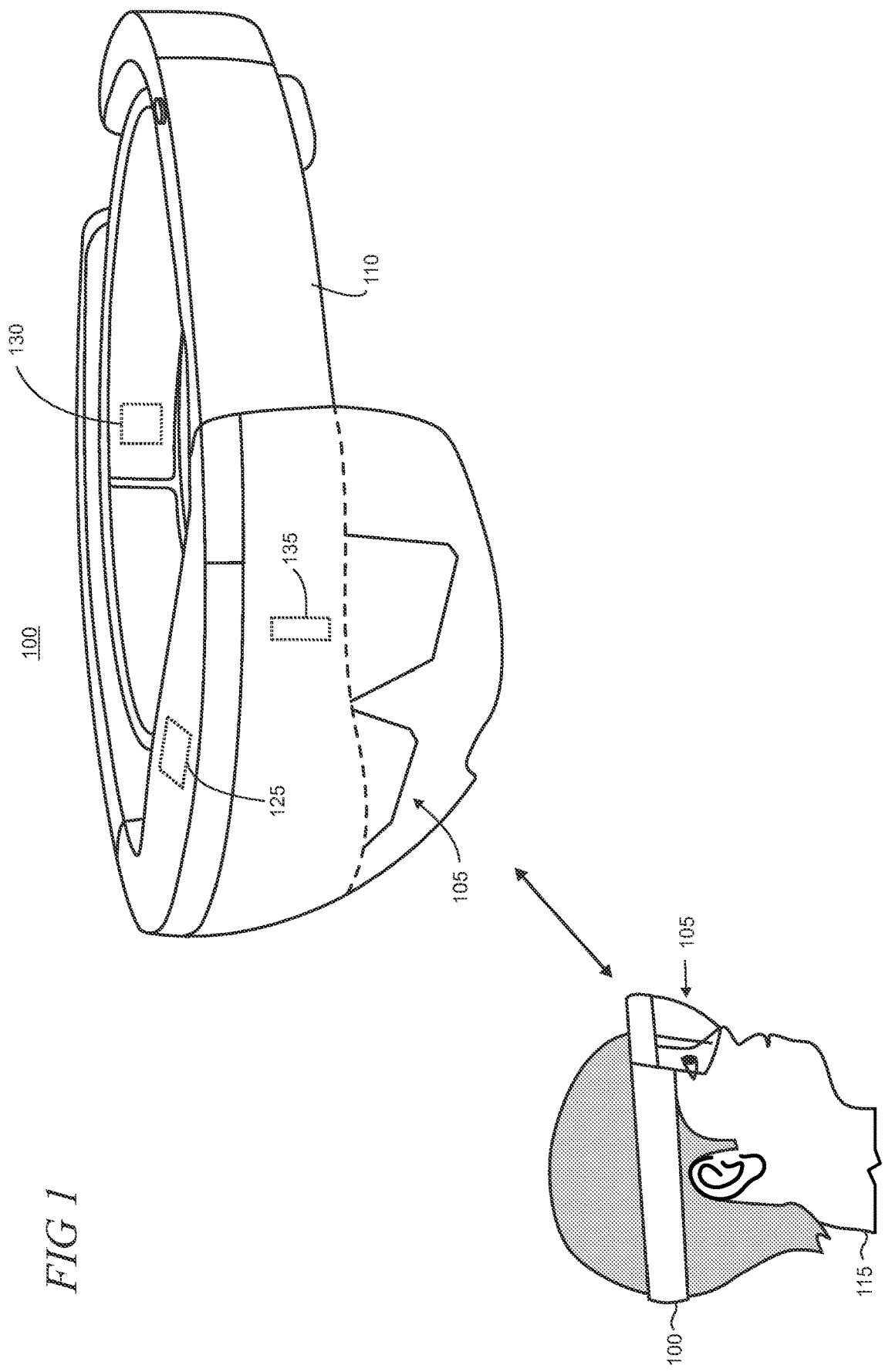
FIG. 1 shows a pictorial partially cutaway view of an illustrative HMD device that is configured with the present waveguide combiner with stacked plates.

The present waveguide combiner includes a stack of plates and is based on propagation of a virtual image light field in an optical guide embodied in the plate stack that essentially operates as a transparent periscope (e.g., on a per-eye basis) with a single entrance pupil and an exit pupil that is expanded (e.g., replicated) in horizontal and vertical directions. A typical application for the waveguide combiner is a mixed-reality wearable headset such as smart glasses or an HMD device. In a mixed-reality user experience, the combiner provides a display system for both digital content (i.e., images of virtual objects) and the real world for the user's eye.

The waveguide combiner uses input and output couplers comprising ROEs to respectively in-couple light for virtual images from a display engine to the waveguide combiner and out-couple the virtual images to the user's eyes. The in-coupling ROE is disposed in a top plate of the stack and the out-coupling ROE is disposed in a bottom plate of the stack. An intermediate ROE is disposed in the virtual image light path between the input and output couplers. The intermediate ROE may be viewed as being physically split and embodied into the top plate and bottom plate. The ROEs in the top plate are aligned with the ROEs in the bottom plate. While the overall footprint, including shape and size, of the ROEs in the top and bottom plates are common, the ROEs are each uniquely constructed with different configurations of mirror elements to guide virtual image light in the waveguide combiner differently. The ROE in the top plate provides horizontal exit pupil expansion of virtual images while coupling the light to the ROEs in the bottom plate. The ROEs in the bottom plate couple the virtual image light to the out-coupling ROE.

In an illustrative embodiment of the present waveguide combiner with stacked plates, one or more optical elements are provided on a supplemental plate that is disposed in the stack, for example, between the top and bottom plates. The optical elements in the supplemental plate provide various added functionalities and features to the waveguide combiner such as filtering, coupling, and beam steering. The optical elements of the supplemental plate are operable statically (e.g., spectral and polarizing filters, and the like) and/or dynamically (e.g., microelectromechanical systems (MEMS), tunable microlens arrays (MLAs), switchable holographic optical elements, and the like). In some implementations, two or more supplemental plates of optical elements providing additional functions and features are utilized in the stack. Such supplemental plates are sandwiched between the top and bottom plates, or alternatively, interleaved with the top and bottom plates.

In other illustrative embodiments, the top and bottom plates are configured to split up functions for guiding virtual image light in the waveguide combiner. In an illustrative embodiment, an ROE in the top plate is configured to provide exit pupil expansion fully in one direction and partial expansion in a second direction while an ROE in the bottom plate provides the remaining exit pupil expansion in the second direction. In another illustrative embodiment, an ROE in the top plate is configured to guide virtual image light for a partial portion of a field of view (FOV) of the entrance pupil to the waveguide combiner, while an ROE in the bottom plate guides another partial portion of the FOV, or the remaining portion of the full FOV. Various optical elements disposed on a supplemental plate in the stack may be utilized in some implementations of split functionality between the top and bottom plates.

The present waveguide combiner with stacked plates provides technical advantages over conventional waveguide combiner designs. Splitting exit pupil expansion functionality between the top and bottom plates in the stack reduces fabrication complexity for the waveguide combiner. In particular, the intermediate and out-coupling ROEs in the bottom plate are configured with tilted mirror structures that advantageously avoids the combination of tilted and non-tilted mirror structures in the same plate which are typically needed in conventional waveguide combiner designs that use a single plate for all the ROEs. The split functionality for guiding partial portions of the FOV between the top and bottom plates enables implementation of a larger FOV and/or improved angular resolution. Utilization of a supplemental plate enables the implementation of a variety of features to improve the mixed-reality HMD device user experience and immersiveness such as enhancements to color uniformity, contrast, vergence-accommodation conflict mitigation, eyebox size, hard edge occlusion, user vision-correction prescription integration and the like.

Turning now to the drawings, FIG. 1 shows a pictorial partially cutaway view of an illustrative example of an HMD device 100 that is configured to utilize the present waveguide combiner with stacked plates. The HMD device includes a display system 105 and a frame 110 that wraps around the head of a user 115 to position the display system near the user's eyes to provide a mixed-reality experience to the user. In an illustrative example, the display system 105 is see-through so that the user 115 of the HMD device can view physical, real-world objects in the physical environment over which pixels for virtual objects are overlayed. Such pixels are collectively referred to herein as "virtual images" which may include fixed-focus stereo images and/or variable-focus stereo images in some applications. It is noted that the term "hologram" is also commonly utilized in mixed-reality literature to refer to stereo virtual images.

For example, the display system 105 includes one or more at least partially transparent waveguides used in conjunction with a virtual image-producing display engine or virtual imaging device such as, for example, a microdisplay panel comprising RGB (red, green, blue) light emitting diodes (LEDs), an organic LED (OLED) array, LCoS (liquid crystal on silicone) device, MEMS devices in a scanning display engine, and/or any other suitable display devices or microdisplay devices operating in transmission, reflection, or emission. The display engine generally includes electronics such as processors, optical components such as mirrors and/or lenses, and/or mechanical and other components that enable a virtual display to be composed and provide one or more optical beams for virtual images to the display system as an input.

In typical applications, the frame 110 supports additional components of the HMD device 100, including a processor 125, an inertial measurement unit (IMU) 130, and an eye tracker 135. The processor includes logic and associated computer memory configured to receive sensory signals from the IMU and other sensors, to provide display signals to the display system 105, to derive information from collected data, and to enact various control processes described herein.

The display system 105 is arranged in some implementations as a near-eye display. In a near-eye display, the display engine or imaging device does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display system are visible.

Figure 2:
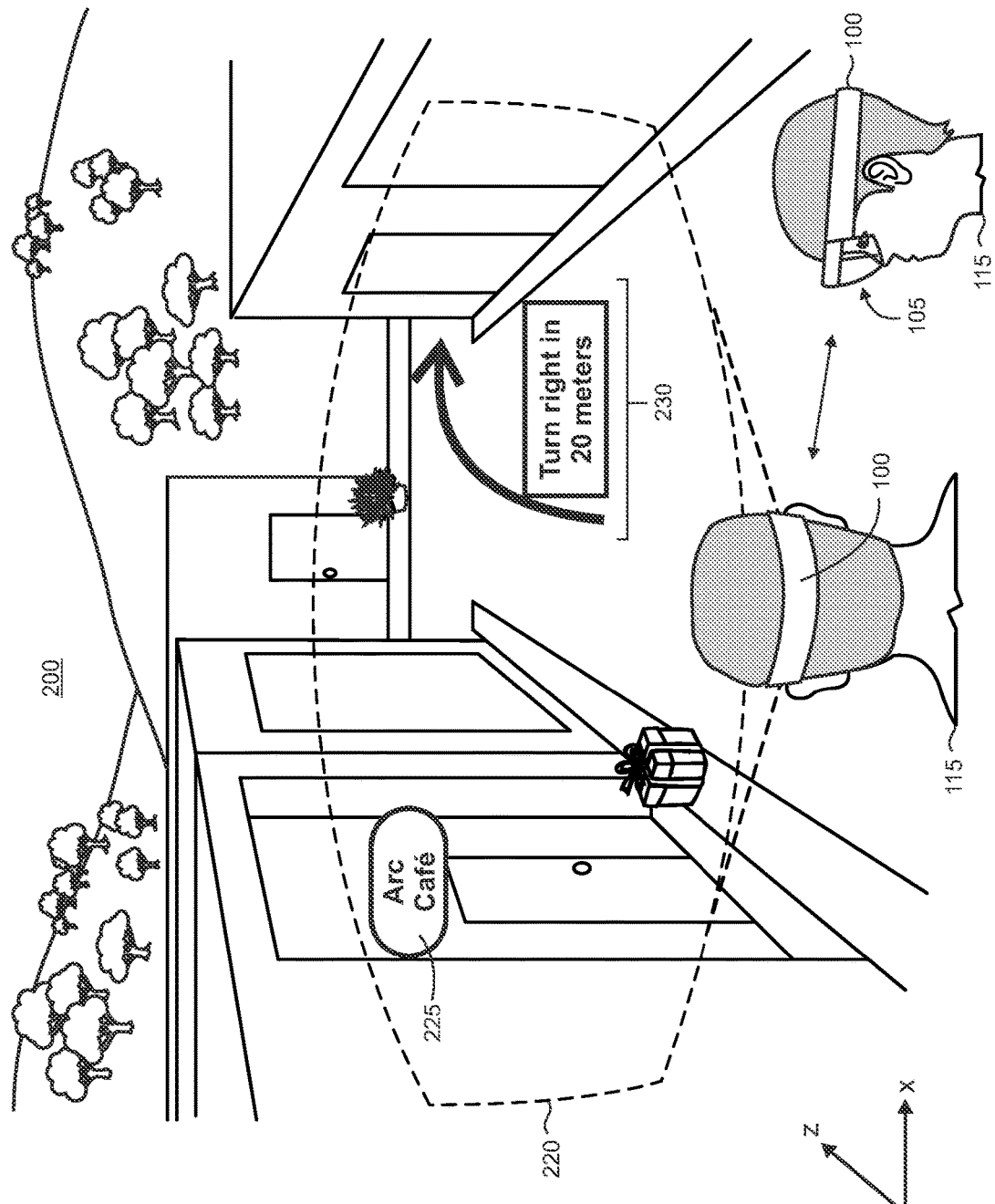
FIG. 2 illustratively shows virtual images that are overlayed onto real-world images within a field of view (FOV) of a mixed-reality head-mounted display (HMD) device.

FIG. 2 shows the HMD device 100 worn by a user 115 as configured for mixed-reality experiences in which the display system 105 is implemented as a near-eye display system having at least a partially transparent, see-through waveguide, among various other components. As noted above, a suitable display engine (not shown) generates virtual images that are guided by the waveguide in the display system to the user. Being see-through, the waveguide in the display system enables the user to perceive light from the real world.

The see-through waveguide-based display system 105 can render images of various virtual objects that are superimposed over the real-world images that are collectively viewed using the see-through waveguide display to thereby create a mixed-reality environment 200 within the HMD device's FOV (field of view) 220. It is noted that the FOV of the real world and the FOV of the images in the virtual world are not necessarily identical, as the virtual FOV provided by the display system is typically a subset of the real FOV. FOV is typically described as an angular range in horizontal, vertical, or diagonal dimensions over which virtual images can be projected.

It is noted that FOV is just one of many parameters that are typically considered and balanced by HMD device designers to meet the requirements of a particular implementation. For example, such parameters may include eyebox size, brightness, transparency and duty time, contrast, resolution, color fidelity, depth perception, size, weight, form-factor, and user comfort (i.e., wearable, visual, and social), among others.

In the illustrative example shown in FIG. 2, the user 115 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the virtual images include a tag 225 that identifies a restaurant business and directions 230 to a place of interest in the city. The mixed-reality environment 200 seen visually on the waveguide-based display system may also be supplemented by audio and/or tactile/haptic sensations produced by the HMD device in some implementations.

Figure 3:
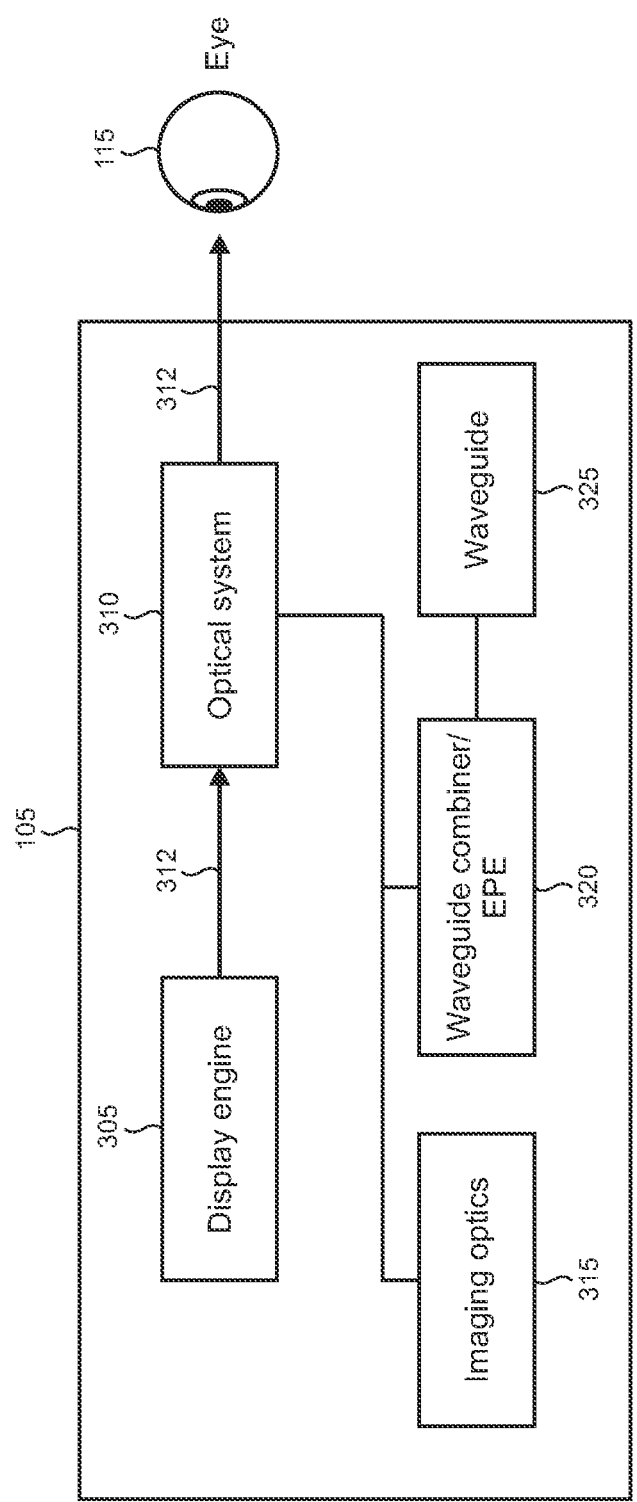
FIG. 3 shows illustrative components of a display system that may be utilized in an HMD device.

FIG. 3 shows illustrative components of the display system 105 utilized in the HMD device 100 in an illustrative mixed-reality embodiment. The display system includes a display engine 305 and an optical system 310 to provide virtual images and views of the real world to the user 115 over a light path 312. The optical system includes imaging optics 315 to support an optical interface between the light engine and a waveguide combiner 320 which, in this example, includes an exit pupil expander (EPE) functionality. The imaging optics typically include optical elements such as lenses, mirrors, filters, gratings, and the like, and may further include electromechanical elements such as MEMS devices in scanning type light engine implementations.

A waveguide 325 facilitates light transmission between the display engine 305 and the user's eye 115 over the light path 312. One or more waveguides can be utilized in the display system 105 because they are transparent (or partially transparent in some implementations) and because they are generally small and lightweight (which is desirable for HMD devices where size and weight are generally sought to be minimized for reasons of performance and user comfort). For example, the waveguide can enable the display engine to be located out of the way, for example, on the side of the user's head or near the forehead, leaving only a relatively small, light, and transparent waveguide optical element in front of the eyes.

Figure 4:
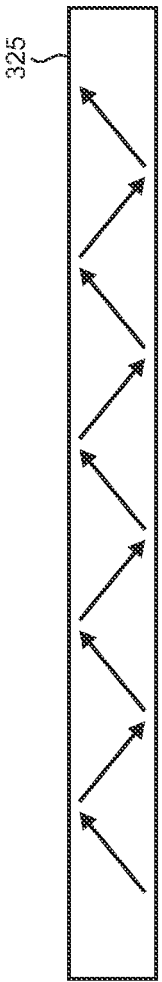
FIG. 4 shows propagation of light in a waveguide by total internal reflection (TIR)

In an illustrative implementation, the waveguide 325 operates using a principle of total internal reflection (TIR), as shown in FIG. 4, so that light can be coupled among the various optical elements in the display system 105. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

As discussed in more detail below, the waveguide 325 is configured to include reflective optical elements (ROEs) having mirror structures or other reflective and/or partially reflective surfaces to guide light propagation over the light path 312 in the waveguide combiner 320 within a defined spatial region within the waveguide. For example, reflective coatings using one or more dielectric layers and/or other suitable interfaces or structures may be included to guide light within the waveguide. The ROEs and/or reflective surfaces may be polarization sensitive in some embodiments as discussed below.

Figure 5:
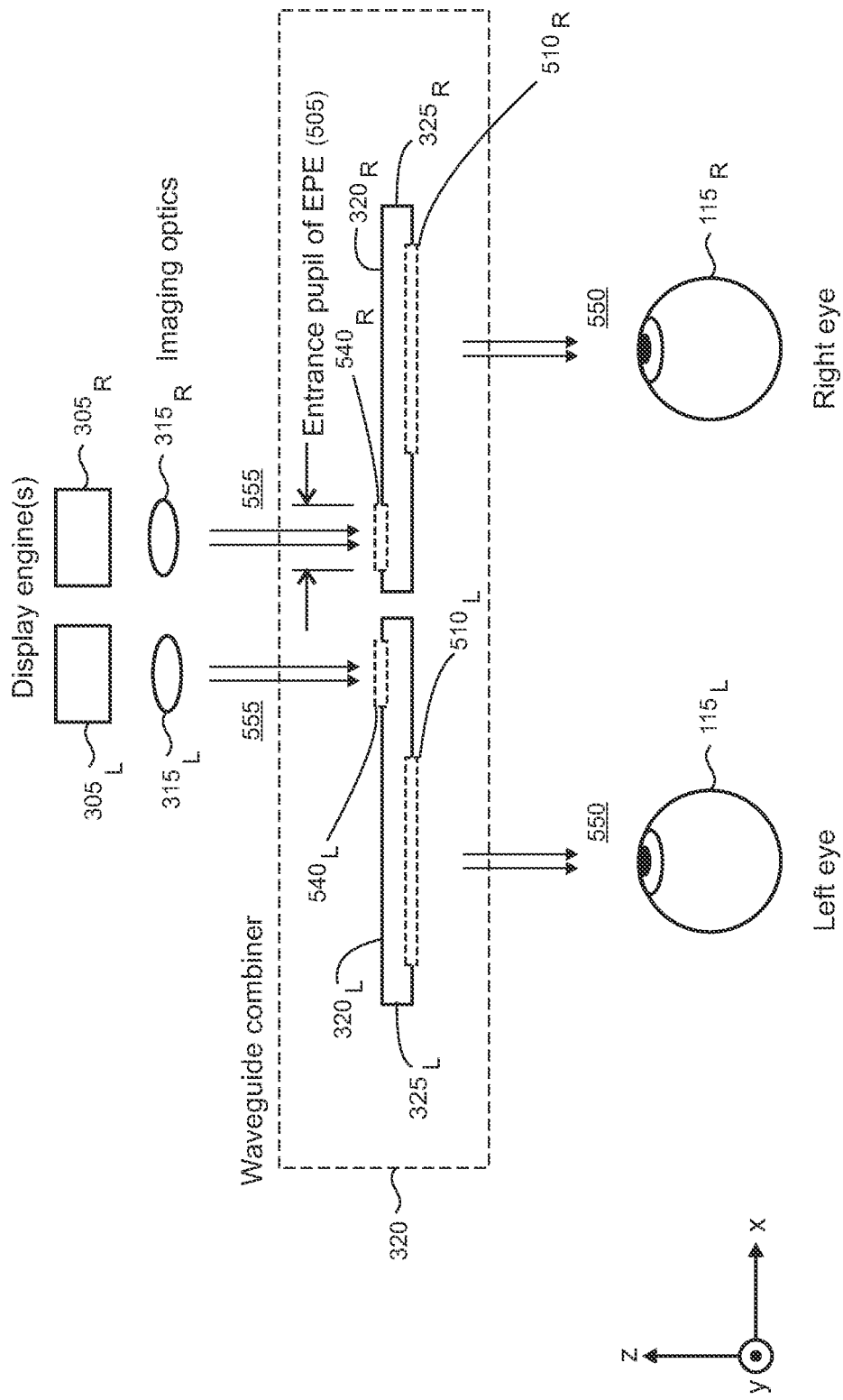
FIG. 5 shows a top view of an illustrative waveguide combiner that includes an exit pupil expander.

FIG. 5 shows a top view of an illustrative waveguide combiner 320 that uses separate left and right combiners ($320_L$ and $320_R$), each associated with a respective display engine ($305_L$ and $305_R$) and imaging optics ($315_L$ and $315_R$) to generate, for example, stereo virtual images for the user 115. Each waveguide includes EPE functionality and receives one or more input optical beams from a respective display engine as an entrance pupil 505 for virtual image light to produce one or more output optical beams with expanded exit pupil in one or two directions relative to the input. The expanded exit pupil typically facilitates a virtual display to be sufficiently sized to meet the various design requirements, such as eyebox size, image resolution, FOV, and the like, of a given optical system while enabling the imager and associated components to be relatively light and compact.

The waveguide combiner 320 utilizes two output couplers, $510_L$ and $510_R$ that are supported on the waveguides $325_L$ and $325_R$ and two input couplers $540_L$ and $540_R$. The input and output couplers are configurable as ROEs. One or more intermediate ROEs (not shown in FIG. 5) are supported on the left and right waveguides in a stacked plate configuration, as described below. The ROEs are generally arrangeable in various configurations on the waveguides, for example, on the same side or different sides of the waveguides and may further be single- or double-sided in some implementations. While the waveguide combiner is depicted as having a planar configuration, other shapes may also be utilized including, for example, curved or partially spherical shapes, in which case mirror structures in the ROEs disposed thereon may be non-co-planar.

Exemplary output beams 550 from the waveguide combiner 320 are parallel to the exemplary input beams 555 that are output from the display engines 305 to the input couplers 540. In some implementations, the input beams are collimated such that the output beams are also collimated, as indicated by the parallel lines in the drawing. Typically, in waveguide-based combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread.

Figure 6:
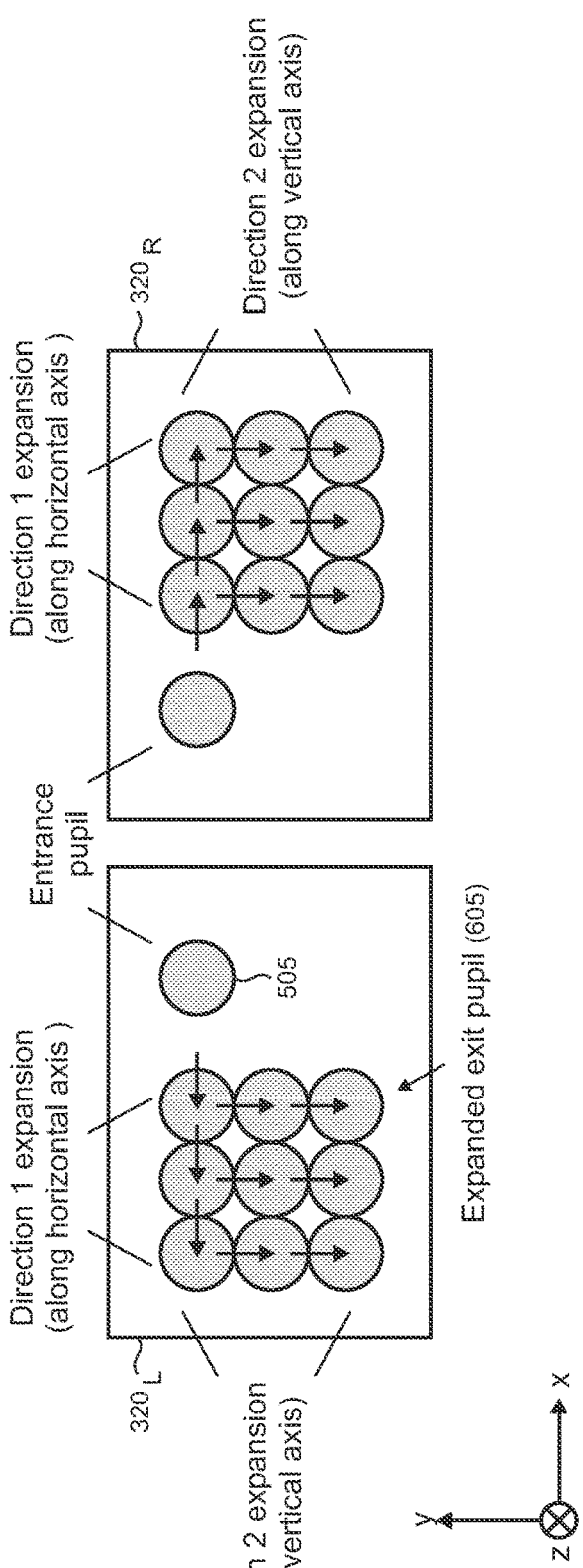
FIG. 6 shows a front view of an illustrative waveguide combiner with exit pupil expander in which the exit pupil is expanded along two directions of the field of view (FOV) via pupil replication.

As shown in FIG. 6, the waveguide combiner 320 is configured to provide an expanded exit pupil 605 in two directions (i.e., along each of a first and second coordinate axis) compared with the entrance pupil 505 at the input couplers (not shown in FIG. 6) of the waveguide combiner 320. As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye display system is upright and forward facing, but less intuitive for other usage scenarios. The listed terms are not to be construed to limit the scope of the configurations (and usage scenarios therein) of near-eye display features utilized in the present arrangement.

Figure 7:
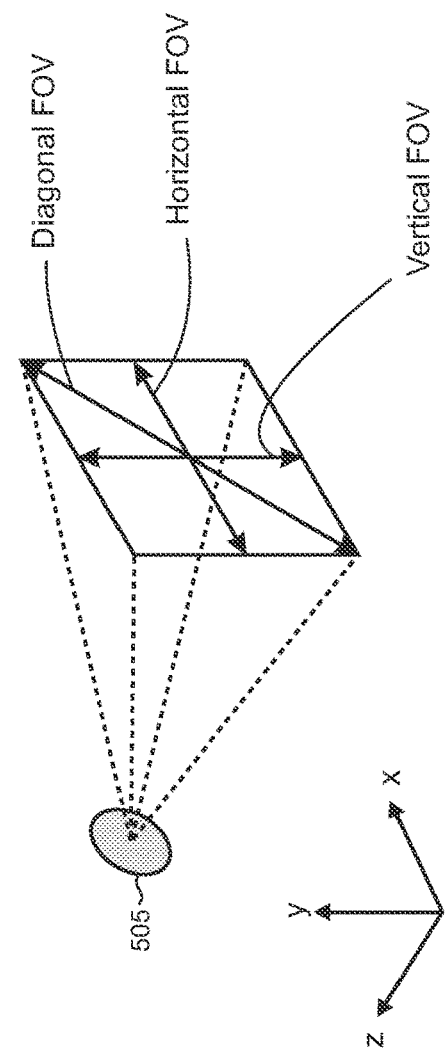
FIG. 7 shows an illustrative input to an exit pupil expander in which the FOV is described by angles in horizontal, vertical, or diagonal orientations.

The entrance pupil to the waveguide combiner at the input couplers 540 is generally described in terms of FOV, for example, using horizontal FOV, vertical FOV, or diagonal FOV as shown in FIG. 7.

FIG. 8 shows an illustrative conventional waveguide combiner 800 that includes reflective ROEs 805, 810, and 815 disposed on a see-through waveguide 820 that provides in-coupling, exit pupil expansion in two directions, and out-coupling in a mixed-reality environment. The illustrative waveguide combiner is shown, for example, for a single eye in a stereo display or is usable in a monoscopic application. The input-coupling ROE 805 receives virtual images from a display engine (not shown) and couples them to the intermediate ROE 810 which horizontally expands the exit pupil and couples the virtual image light downwards (i.e., in the negative y direction) to the output coupling ROE 815. The output-coupling ROE vertically expands the exit pupil and out-couples the virtual image light to a user's eye (not shown) with expanded pupil in two directions.

While the conventional waveguide combiner 800 performs satisfactorily in some display system applications, the FOV of the system may be limited due to TIR constraints imposed by the single waveguide 820 in some cases. In addition, the conventional waveguide combiner can present difficulties in fabrication because all of the ROEs are co-planar along the z axis in the single waveguide. For example, the ROEs typically utilize a combination of tilted and perpendicular mirror structures with respect to the x-y plane, each of which utilize different fabrication techniques to produce. Thus, integrating both types of mirror structures on the same waveguide is often complicated and may result in lower manufacturing yields and increased costs.

Figure 11:
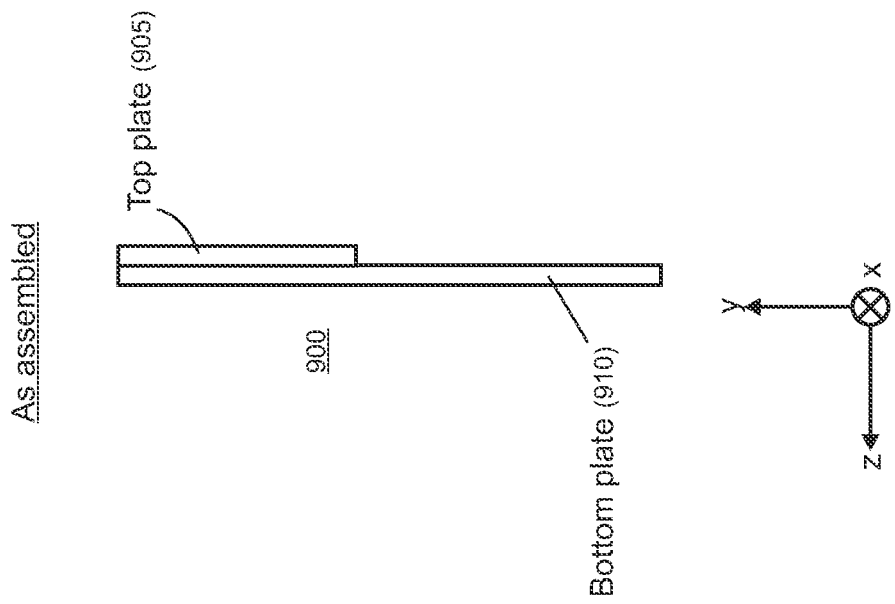
FIG. 11 shows a side view of an illustrative waveguide combiner using ROEs arranged in stacked top and bottom plates, as assembled.
Figure 10:
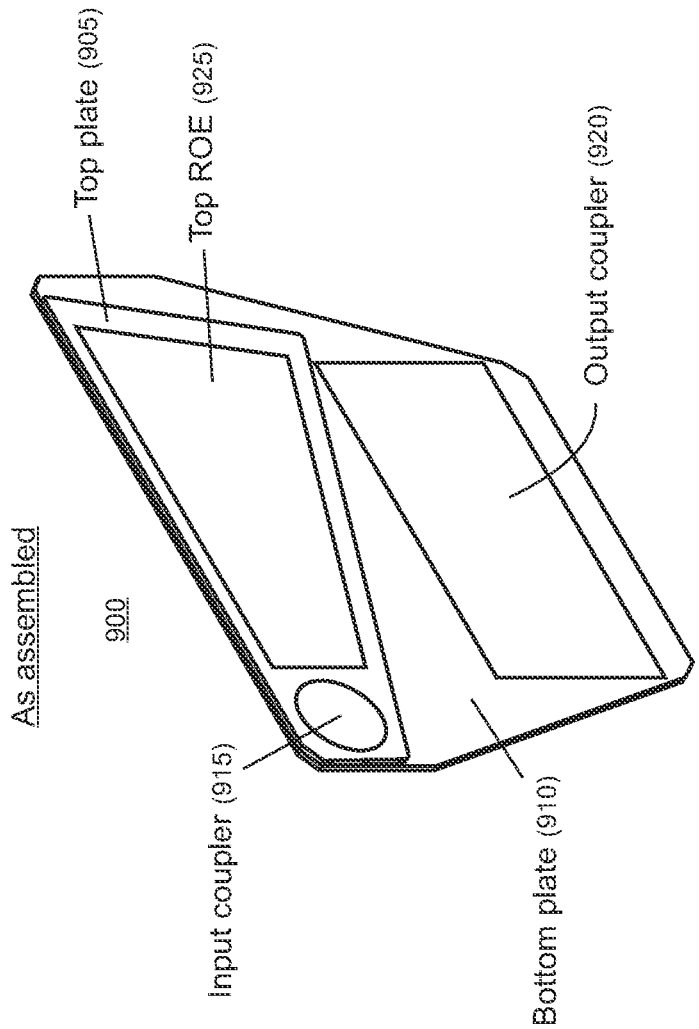
FIG. 10 shows an assembled pictorial view of an illustrative waveguide combiner using ROEs arranged in stacked top and bottom plates, as assembled.

FIG. 9 shows an exploded pictorial view of an illustrative waveguide combiner 900 using ROEs arranged in stacked top and bottom plates 905 and 910. As with the waveguide combiner in FIG. 8, the waveguide combiner 900 is shown for a single eye of a stereoscopic display system or for a monoscopic application. The ROEs include an input coupler 915 disposed in the top plate. The input coupler typically comprises an ROE such as a prism. However, a diffractive optical element or holographic optical element are also usable in some implementations. An output coupler 920, which comprises an ROE in this illustrative example, is disposed in the bottom plate. The intermediate ROE 810 used in the conventional waveguide combiner with a single waveguide shown in FIG. 8 is replaced by an ROE that is essentially functionally split between a top ROE 925 in the top plate and a bottom ROE 930 in the bottom plate. The top and bottom ROEs share a common footprint, including overall shape and size, and are aligned along the z axis when the top and bottom plates are assembled, as shown in the pictorial view in FIG. 10 and side view in FIG. 11.

FIG. 12 shows a first illustrative embodiment of mirror elements in the ROEs in the top plate 905 and bottom plate 910. The mirror elements are arranged in arrays 1205, 1210, and 1215 that are respectively arranged in the top ROE 925, bottom ROE 930, and output coupler 920. The mirror arrays are oriented in the x-y plane of the plates such that they form a cascade along the direction of propagation. As shown in the front disassembled view of the waveguide combiner 900 in FIG. 13, virtual image light propagates in the x direction in the top ROE while also being coupled in the z direction to the bottom ROE. The bottom ROE couples the virtual image light in the negative y direction to the output coupler which out-couples the light in the negative z direction for viewing by the user (not shown).

As noted above, in an alternative illustrative embodiment, the mirror array in the top ROE 925 is configured for horizontally expanding the exit pupil of the virtual images (i.e., along the x axis) and the output coupler 920 is configured for expanding the exit pupil in the vertical direction (i.e., along the y axis). In another alternative illustrative embodiment, the top ROE expands the exit pupil horizontally while partially expanding the exit pupil vertically (i.e., the expansion is one and a half dimensional—1.5D). The mirror array in the bottom ROE 930 is configured to perform the remaining 0.5D expansion or it is performed by the mirror array in the output coupler in some cases.

Figure 14:
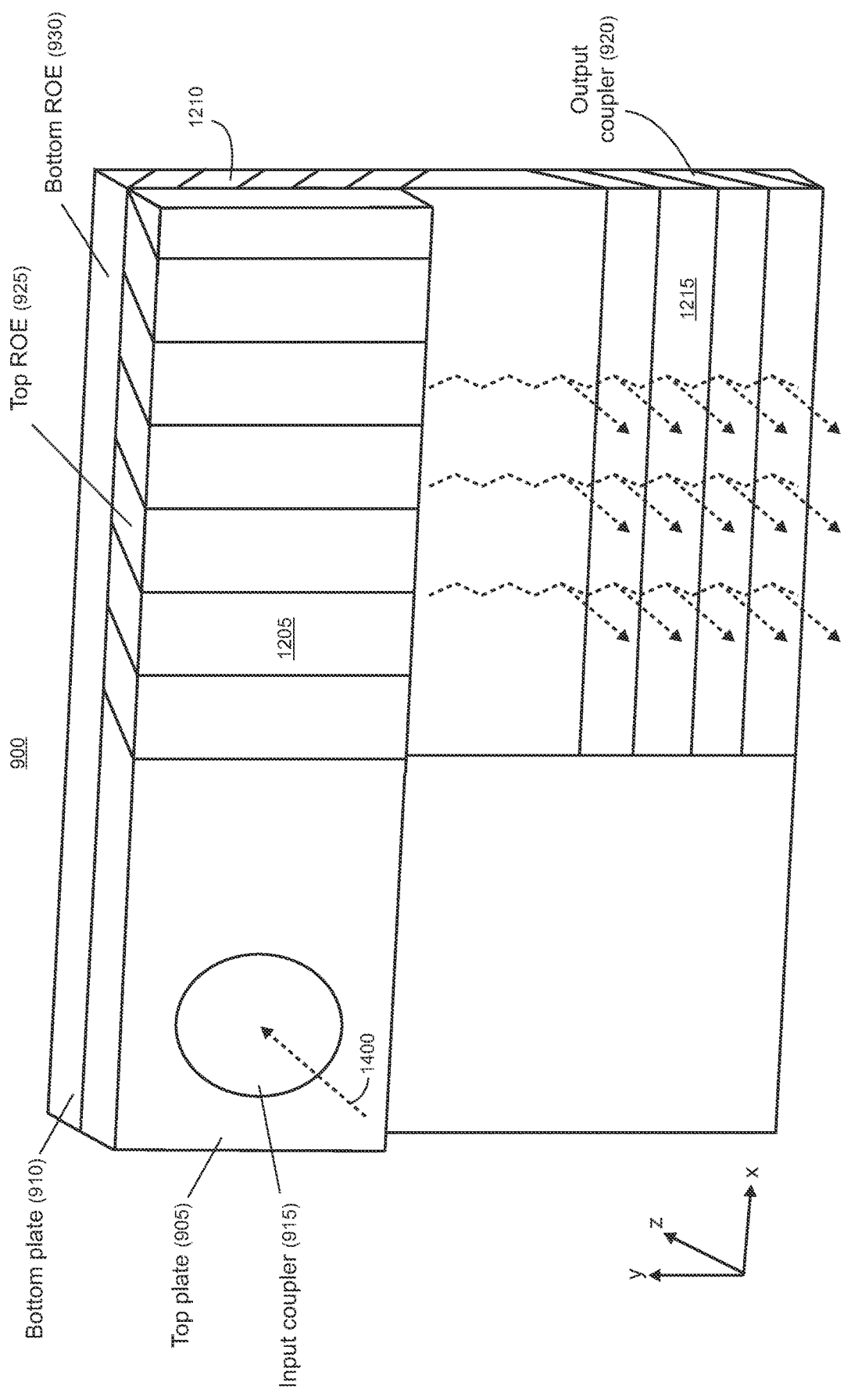
FIG. 14 shows a simplified pictorial view of illustrative input and output paths for virtual image light in the ROEs in the top and bottom plates when assembled in the present waveguide combiner.

FIG. 14 shows a simplified pictorial view of illustrative input and output paths for virtual images in the ROEs 925 and 930 in the respective top and bottom plates 905 and 910, when assembled, showing the horizontal and vertical exit pupil expansion for a representative virtual image input beam 1400 at the input coupler 915. As shown, the mirrors in the cascaded arrays 1205, 1210, and 1215 are generally tilted with respect to the x-y plane of the plates.

FIG. 15 shows a second illustrative embodiment of mirror elements in ROEs 1505 and 1510 in respective top and bottom plates 1515 and 1520 of a waveguide combiner 1500. The mirror elements are arranged in cascaded arrays 1525 and 1530 that are positioned at oblique angles in the x-y plane with respect to the x and y axes. The input coupler 1535 and output coupler 1540 are configured in a similar manner to their counterparts 915 and 920 in waveguide combiner 900 (FIG. 9). While the propagation path in the ROEs will differ from the first illustrative embodiment of the waveguide combiner 900, the overall functionality of the waveguide combiners 900 and 1500 are similar.

FIG. 16 is a top view of a first illustrative embodiment of a top ROE 925 using a concatenated array 1605 of mirror elements that are embedded in a planar waveguide 1610. The input coupler 915 is embodied as a prism in this embodiment which in-couples virtual image light from the display engine 305 and imaging optics 315 to the waveguide. The construction and arrangement of mirror elements shown in FIG. 16 are generally applicable to the bottom ROE and output coupler in typical applications. The individual mirror elements (representatively indicated by reference numeral 1615) are implemented in this illustrative embodiment using thin film coatings to provide partial reflectivity (i.e., beam splitting functionality), as described in further detail below. The mirror elements are alternatively implementable as half-tone, dielectric, embedded microprism arrays, or volume holograms, using flat or curved construction. In some implementations the mirror elements are lensed using various lens powers, typically depending on a distance from the display engine. In some implementations, the mirror elements in the array are variable with respect to type and reflectance/transmittance. As shown, the mirror elements are tilted with respect to the x-y plane of the waveguide.

FIG. 17 is a top view of a second illustrative embodiment of a top ROE 925 using a concatenated array 1705 of mirror elements that are partially embedded in a planar waveguide 1710. The mirror elements (representatively indicated by reference numeral 1715) are implementable using similar configuration options as with the fully embedded mirror elements in array 1605 (FIG. 16). The partial embedding provides some waveguide combiner design flexibility in some applications, for example, with respect to enhancements to see-through functionality, depth of focus, and/or FOV.

FIG. 18 is a top view of a third illustrative embodiment of a top ROE 925 using a concatenated array 1805 of fractured mirror elements that are embedded in a planar waveguide 1810. The fractured mirror elements (representatively indicated by reference numeral 1815) can function as a Fresnel element and/or gain see-through or depth of focus for the waveguide combiner. Otherwise, the mirror elements are implementable using similar configuration options as with the fully or partially embedded mirror elements described above.

Figure 19:
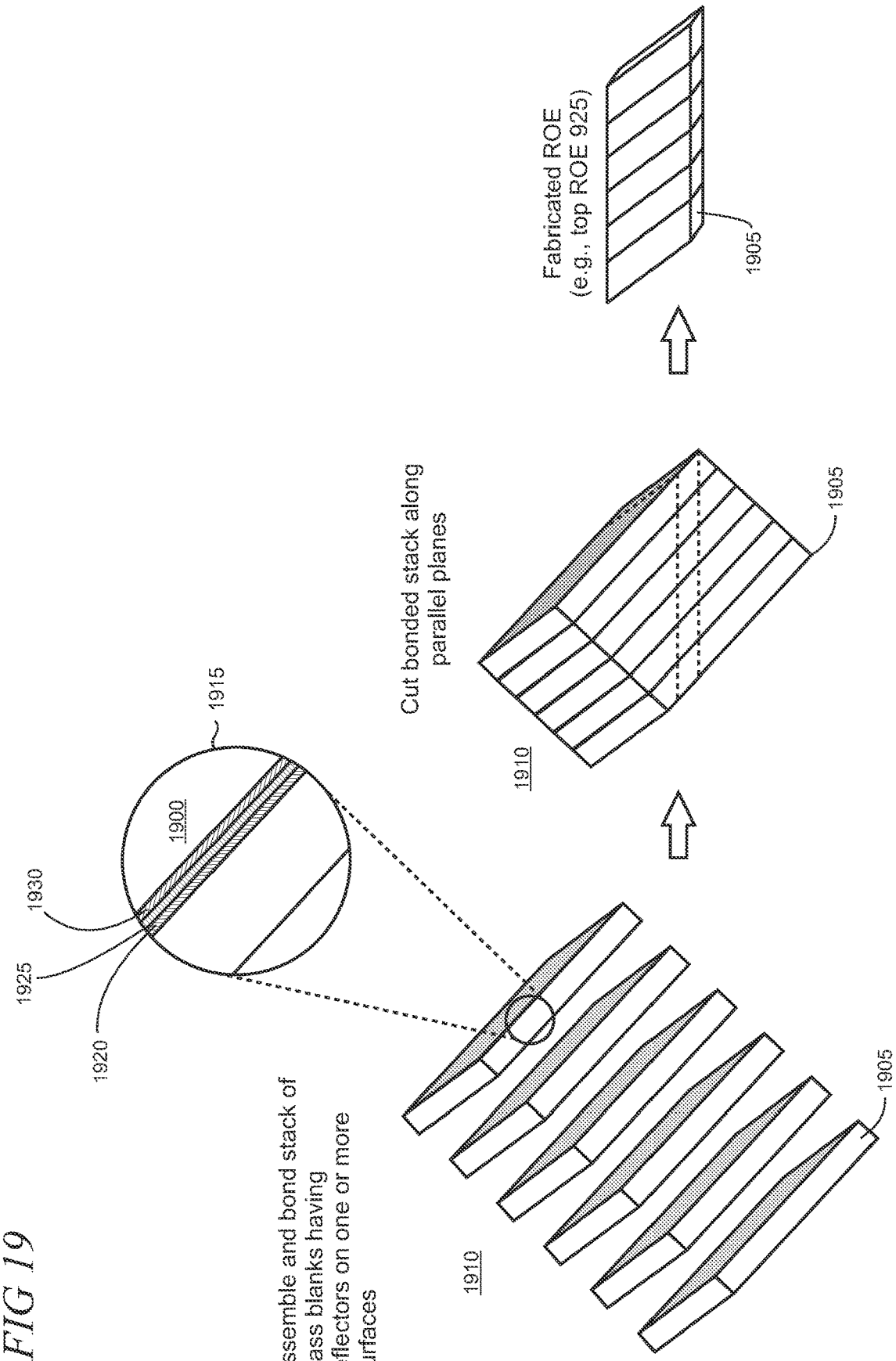
FIG. 19 shows illustrative fabrication techniques for an ROE using stacked glass blanks that have one or more layers of thin film deposited on one or more surfaces.

FIG. 19 shows illustrative fabrication techniques for an ROE using stacked glass blanks that have one or more layers of thin film deposited on one or more surfaces. A glass sheet is cut to form uniformly sized and shaped blanks. The sheet is provided with reflectors, such as thin film coatings, prior to cutting, or the blanks may be individually provided with reflectors or coatings after cutting. The blanks, representatively indicated by reference numeral 1905, are assembled into a stack 1910 using a bonding agent on the major planar surfaces and/or around the peripheral edges. It will be appreciated that the number of blanks in the stack determines the number of cascaded mirror elements in an array. Cutting, grinding, and/or polishing steps can optionally be utilized during the fabrication and assembly of the blanks, stack, or ROE.

The stack 1910 is cut along parallel planes at an oblique angle with respect to the stack axis that is suitable to implement a desired amount of tilt in the mirror elements in the finished ROE (e.g., the top ROE 925). In this illustrative example, as shown in the enlarged view 1915, the top planar surface of each blank is coated with a thin-film coating 1900 comprising single or multiple layers of dielectric materials in which the coating composition and thickness is selected to provide the desired reflectance characteristics over the FOV of interest. For example, the dielectric materials may each be different, as indicated in the enlarged view by reference numerals 1920, 1925, and 1930, or alternating layers of two or more different materials are usable in some cases. Generally, each dielectric material has a different index of refraction or other characteristics and may include silicon dioxide ($SiO_2$), titanium dioxide ($TiO_2$), and aluminum oxide ($Al_2O_3$). In an illustrative embodiment, the layers of different materials are alternately arranged using, for example, silicon dioxide and titanium dioxide.

Other exemplary dielectric materials that can be included in the coating 1900 may include, but are not limited to, silicon hydride ($Si_xH_y$), silicon nitride ($Si_xN_y$), silicon oxynitride ($Si_xO_zN_y$), tantalum oxide ($Ta_xO_y$), gallium arsenide (GaAs), and gallium nitride (GaN). It is also possible that one or more layers of the coating may comprise metallic layers that are non-dielectric.

Chemical and/or physical deposition techniques can be used to deposit the materials on a surface of a blank 1905 to form the coating 1900. Exemplary chemical deposition techniques that can be used include, but are not limited to, chemical solution deposition (CSD), spin coating, chemical vapor deposition (CVD), plasma-enhanced chemical film conversion (PECFC), and atomic layer deposition (ALD). Exemplary physical deposition techniques that can be used include, but are not limited to, physical vapor deposition (PVD), molecular beam epitaxy (MBE), sputtering, pulsed laser deposition (PLD), cathodic arc deposition (arc-PVD), and electrohydrodynamic deposition.

It is noted that the number of layers shown in FIG. 19 is intended to be illustrative and that variations from the configuration shown can be expected, as necessary to meet the requirements of a particular implementation. In general, it is desirable to minimize the number of layers to simplify fabrication and reduce cost. Thicker coatings may give rise to stresses in the ROEs that can cause strain in the waveguide combiner that may negatively impact alignment and flatness (with concomitant negative impact on display quality) and reduce reliability. While thicker substrates may be used to reduce the strain and help to maintain alignment and flatness, such configuration may result in more weight being added to the waveguide combiner assembly which is typically undesirable in HMD device applications.

An alternative to thin-film coatings for mirror elements in an ROE includes molded plastic optical elements such as microprism arrays which may be suitable in some applications. A microprism array is injection-molded in an illustrative embodiment and may utilize a plastic waveguide in some cases which can advantageously reduce weight and cost. Coatings are applied to microprism arrays in some applications to further enable tuning of reflectance and transmittance parameters.

FIG. 20 shows an exploded pictorial view of an illustrative waveguide combiner 2000 having ROEs arranged in stacked top and bottom plates, 2005 and 2010, in which a supplemental plate 2035 is disposed between the top and bottom plates. The ROEs include an input coupler 2015, top ROE 2025, bottom ROE 2030, and output coupler 2020 that are configured similarly to their counterparts shown in FIG. 9 and described in the accompanying text. FIG. 21 shows a pictorial view of the waveguide combiner 2000, as assembled. FIG. 22A shows a side view of the waveguide combiner 2000, as assembled.

The supplemental plate 2035 is configured to include one or more optical elements providing various added functionalities and features to the waveguide combiner such as filtering, coupling, and beam steering. Illustrative examples of optical elements are shown in table 2300 in FIG. 23. More than one supplemental plate can be utilized in some waveguide combiner implementations. For example, FIG. 22B shows a side view of a waveguide combiner 2200 having two supplemental plates of optical elements—supplemental plate A 2235 and supplemental plate B 2240—that are sandwiched between a top plate 2205 and bottom plate 2210. FIG. 22C shows a side view of a waveguide combiner 2250 having two supplemental plates of optical elements— supplemental plate C 2255 and supplemental plate D 2260— that are interleaved with a top plate 2265 and bottom plate 2270. The number of supplemental plates and their stacking arrangement can vary depending on the particular requirements of a given waveguide combiner implementation.

FIG. 23 shows a table 2300 providing illustrative examples of optical elements 2305 that are usable in one or more supplemental plates to implement various features and/or functions 2310. The optical elements listed in the table are intended as illustrative and non-limiting examples. The particular optical elements used will typically depend on the particular requirements of a given waveguide combiner implementation.

Figure 24:
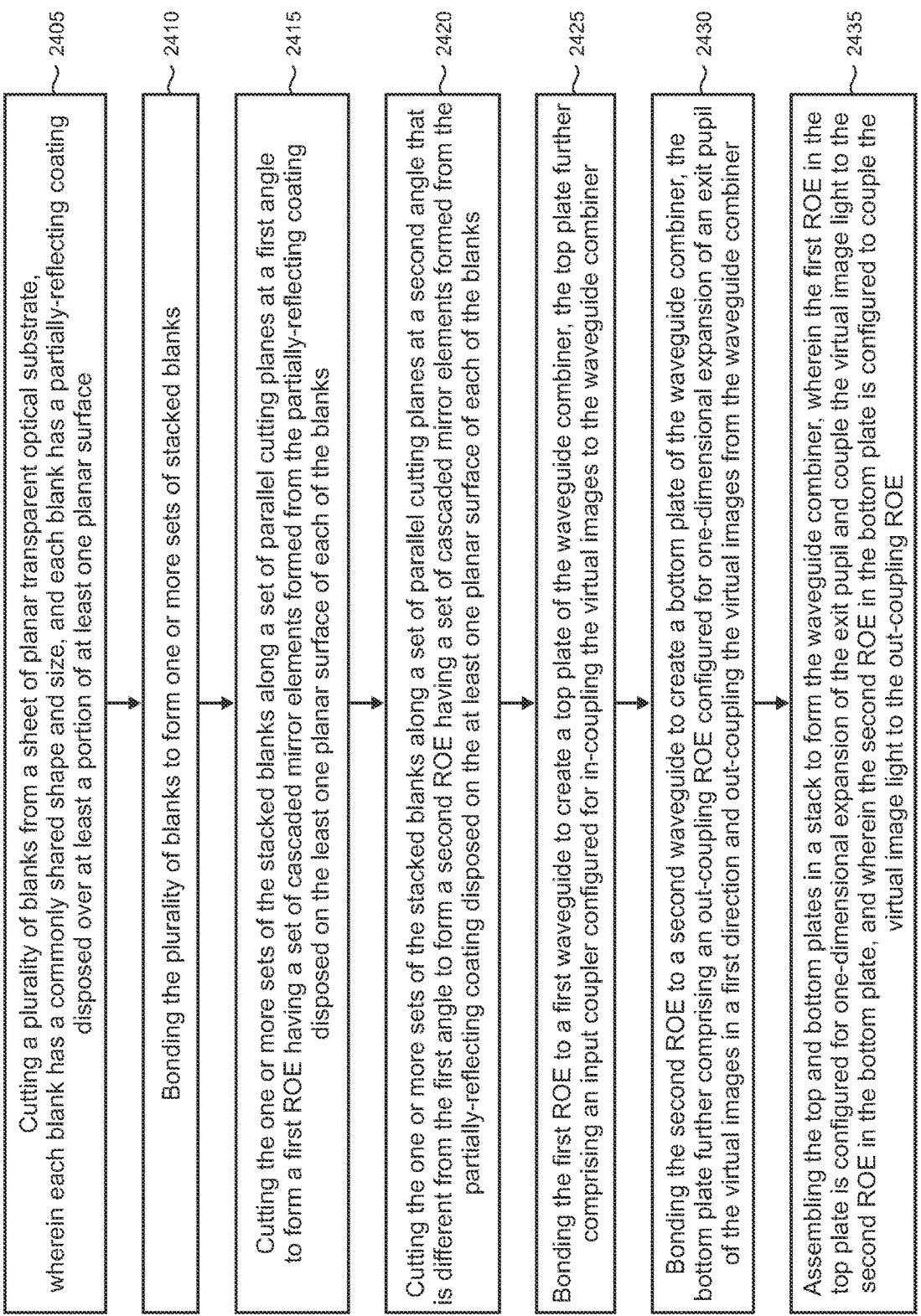
FIG. 24 is a flowchart of an illustrative method for assembling a waveguide combiner having stacked plates of ROEs.

FIG. 24 is a flowchart of an illustrative method 2400 for fabricating a waveguide combiner with stacked plates of ROEs. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 2405 includes cutting a plurality of blanks from a sheet of planar transparent optical substrate, wherein each blank has a commonly shared shape and size, and each blank has a partially-reflecting coating disposed over at least a portion of at least one planar surface. Block 2410 includes bonding the plurality of blanks to form one or more sets of stacked blanks.

Block 2415 includes cutting the one or more sets of the stacked blanks along a set of parallel cutting planes at a first angle to form a first ROE having a set of cascaded mirror elements formed from the partially-reflecting coating disposed on the least one planar surface of each of the blanks. Block 2420 includes cutting the one or more sets of the stacked blanks along a set of parallel cutting planes at a second angle that is different from the first angle to form a second ROE having a set of cascaded mirror elements formed from the partially-reflecting coating disposed on the at least one planar surface of each of the blanks. Block 2425 includes bonding the first ROE to a first waveguide to create a top plate of the waveguide combiner, the top plate further comprising an input coupler configured for in-coupling the virtual images to the waveguide combiner. Block 2430 includes bonding the second ROE to a second waveguide to create a bottom plate of the waveguide combiner, the bottom plate further comprising an out-coupling ROE configured for one-dimensional expansion of an exit pupil of the virtual images in a first direction and out-coupling the virtual images from the waveguide combiner. Block 2435 includes assembling the top and bottom plates in a stack to form the waveguide combiner, wherein the first ROE in the top plate is configured for one-dimensional expansion of the exit pupil and coupling the virtual image light to the second ROE in the bottom plate, and wherein the second ROE in the bottom plate is configured to couple the virtual image light to the out-coupling ROE.

Figure 26:
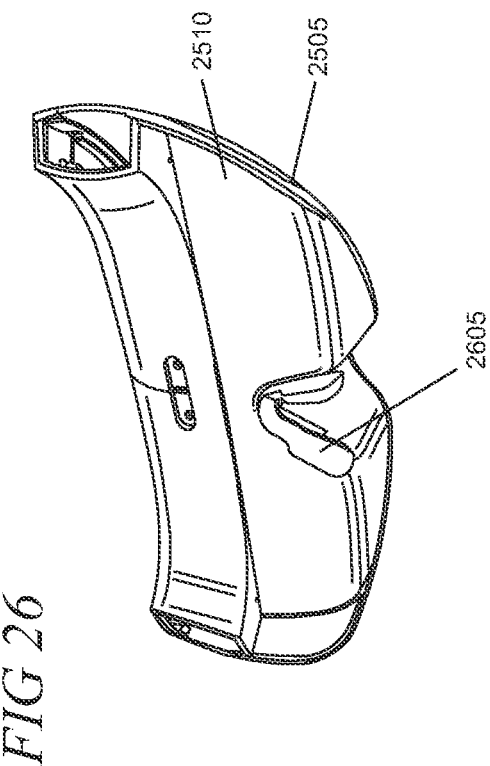
FIG. 26 shows a pictorial rear view of an illustrative sealed visor.
Figure 25:
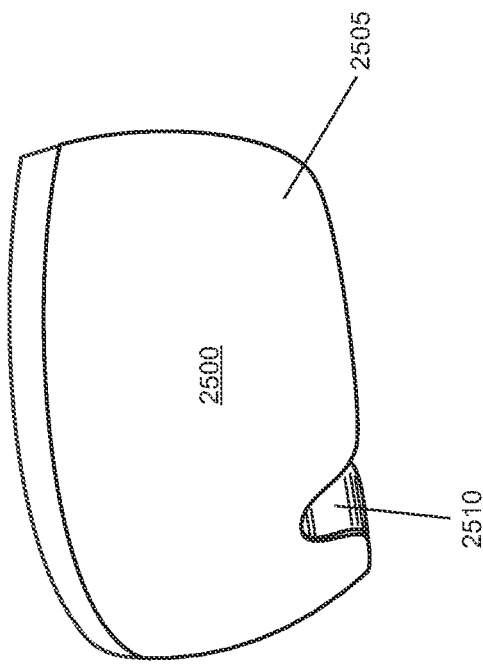
FIG. 25 shows a pictorial front view of an illustrative sealed visor that may be used as a component of an HMD device.

FIGS. 25 and 26 show respective front and rear views of an illustrative example of a visor 2500 that incorporates an internal display system 105 that is used in a head-mounted display (HMD) device 100 worn by a user 115. The display system is configured with the present waveguide combiner with stacked plates described herein. The visor, in some implementations, is sealed to protect the internal display system. The visor typically interfaces with other components of the HMD device 100 such as head-mounting/ retention systems and other subsystems including sensors, power management, controllers, etc., as illustratively described in conjunction with FIGS. 28 and 29. Suitable interface elements (not shown) including snaps, bosses, screws, and other fasteners, etc. may also be incorporated into the visor.

Figure 27:
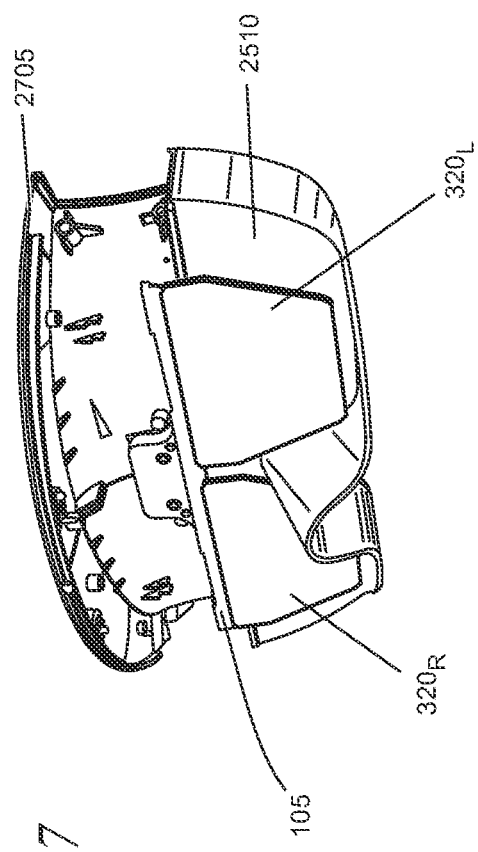
FIG. 27 shows a partially disassembled view of an illustrative sealed visor.

The visor 2500 includes see-through front and rear shields, 2505 and 2510 respectively, that are molded using transparent materials to facilitate unobstructed vision to the optical displays and the surrounding real-world environment. Treatments are optionally applied to the front and rear shields such as tinting, mirroring, anti-reflective, anti-fog, and other coatings, and various colors and finishes are utilizable in various applications. The front and rear shields are affixed to a chassis 2705 shown in the disassembled view in FIG. 27.

The visor 2500 physically protects sensitive internal components, including the display system 105 (shown in FIG. 27), when the HMD device is operated and during normal handling for cleaning and the like. The display system 105 includes left and right waveguide displays $320_L$ and $320_R$ that respectively provide virtual images to the user's left and right eyes in a mixed-reality environment. The visor also protects the display system from environmental elements and damage should the HMD device be dropped or bumped, impacted, etc.

In some implementations, the visor 2500 provides a measure of redundant protection to the ROEs that are internally located in the waveguide combiner in the display system 105. In other implementations, the visor is capable of reduction in size and weight such that the protection provided to the ROEs is shared between the visor and the external major surfaces of the waveguide combiner.

As shown in FIG. 26, the rear shield 2510 is configured in an ergonomically suitable form 2605 to interface with the user's nose, and nose pads and/or other comfort features can be included (e.g., molded-in and/or added-on as discrete components). In some applications, the visor 2500 can also incorporate some level of optical diopter curvature (i.e., vision correction prescription) within the molded shields in some cases. The visor is configurable to incorporate lenses for vision correction prescription and/or virtual image focus at some non-infinite distance.

Figure 28:
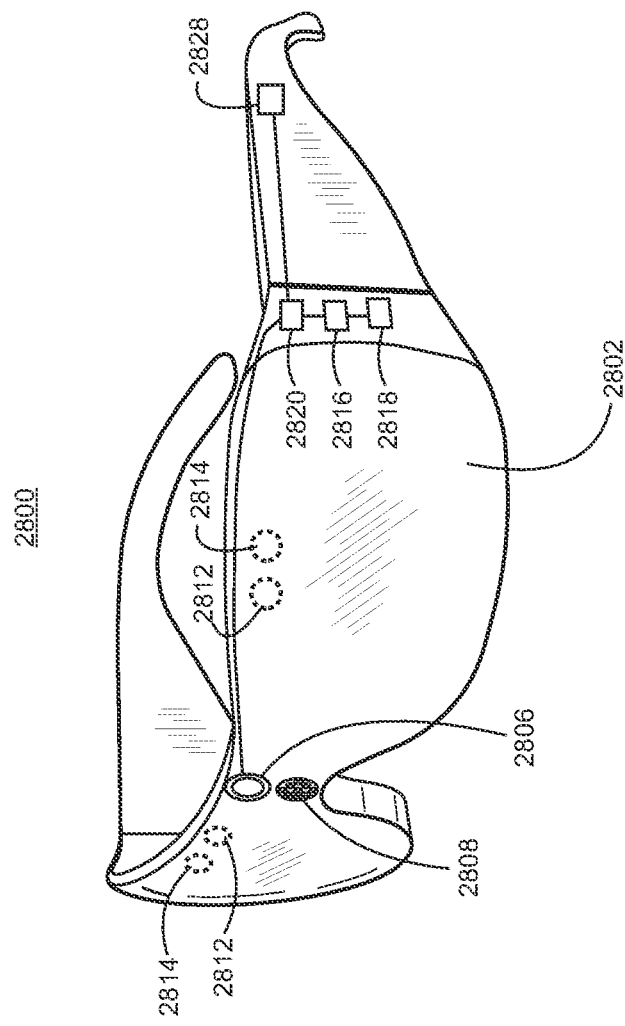
FIG. 28 is a pictorial view of an illustrative example of a mixed-reality HMD device using the present waveguide combiner with stacked plates.
Figure 29:
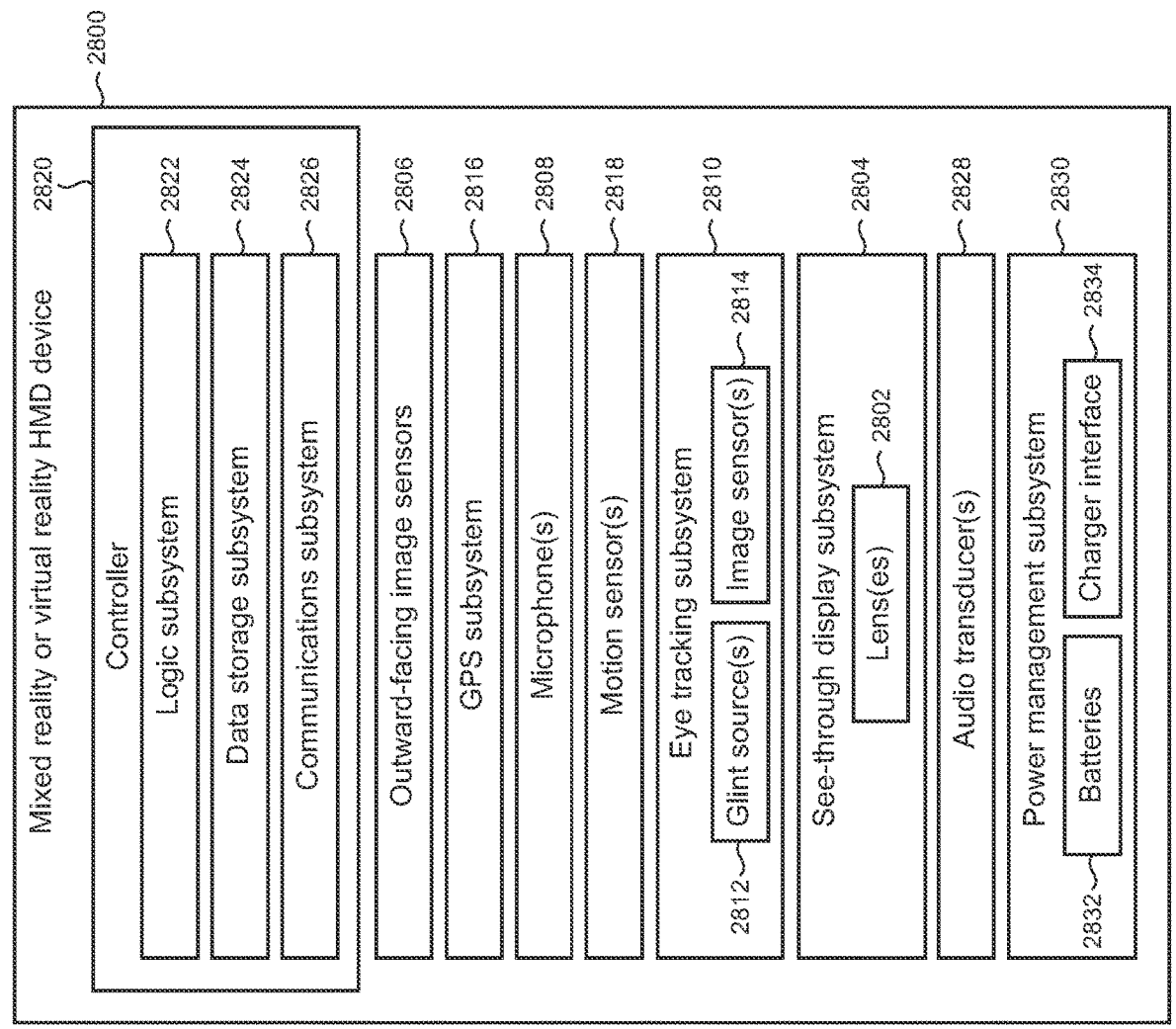
FIG. 29 shows a block diagram of an illustrative example of a mixed-reality HMD device using the present waveguide combiner with stacked plates.

The present waveguide combiner with stacked plates is utilizable in a variety of devices. FIG. 28 shows one particular illustrative example of a mixed-reality HMD device 2800, and FIG. 29 shows a functional block diagram of the device 2800. The HMD device 2800 provides an alternative form factor to the HMD device 105 shown, for example, in FIGS. 1 and 2. HMD device 2800 comprises one or more lenses 2802 that form a part of a see-through display subsystem 2804, so that images may be displayed using lenses 2802 (e.g., using projection onto lenses 2802, one or more waveguide systems, such as a near-eye display system, incorporated into the lenses 2802, and/or in any other suitable manner).

HMD device 2800 further comprises one or more outward-facing image sensors 2806 configured to acquire images of a background scene and/or physical environment being viewed by a user and may include one or more microphones 2808 configured to detect sounds, such as voice commands from a user. Outward-facing image sensors 2806 typically include one or more depth sensors and/or one or more two-dimensional image sensors. In alternative arrangements, a mixed-reality or virtual-reality display system, instead of incorporating a see-through display, displays mixed-reality or virtual-reality images through a viewfinder mode for an outward-facing image sensor.

The HMD device 2800 may further include an eye tracking subsystem 2810 configured for detecting a direction of gaze of each eye of a user or a direction or location of focus, as described above. The eye tracking subsystem 2810 is configurable to determine gaze directions of each of a user's eyes in any suitable manner. For example, in the illustrative example shown, the eye tracking subsystem includes one or more glint sources 2812, such as infrared light sources, that are configured to cause a glint of light to reflect from each eyeball of a user, and one or more image sensors 2814, such as inward-facing sensors, that are configured to capture an image of each eyeball of the user. Changes in the glints from the user's eyeballs and/or a location of a user's pupil, as determined from image data gathered using the image sensor(s) 2814, are used to determine a direction of gaze.

In addition, a location at which gaze lines projected from the user's eyes intersect the external display may be used to determine an object at which the user is gazing (e.g., a displayed virtual object and/or real background object). The gaze detection subsystem 2810 may have any suitable number and arrangement of light sources and image sensors. In some implementations, the gaze detection subsystem 2810 may be omitted.

The HMD device 2800 generally also includes additional sensors. For example, HMD device comprises a global positioning system (GPS) subsystem 2816 to allow a location of the HMD device to be determined. This may help to identify real-world objects, such as buildings, etc., that are located in the user's adjoining physical environment.

The HMD device 2800 may further include one or more motion sensors 2818 (e.g., inertial, multi-axis gyroscopic, or acceleration sensors) to detect movement and position/orientation/pose of a user's head when the user is wearing the system as part of a mixed-reality or virtual-reality HMD device. Motion data is usable, potentially along with eye-tracking glint data and outward-facing image data, for gaze detection and eye tracking, as well as for image stabilization to help correct for blur in images from the outward-facing image sensor(s) 2806. The use of motion data may allow changes in gaze direction to be tracked even if image data from outward-facing image sensor(s) cannot be resolved.

In addition, motion sensors 2818, as well as microphone(s) 2808 and eye tracking subsystem 2810, also may be employed as user input devices, such that a user may interact with the HMD device 2800 via gestures of the eye, neck and/or head, as well as via verbal commands in some cases. It may be understood that the sensors illustrated in FIGS. 28 and 29 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2800 further includes a controller 2820 such as one or more processors having a logic subsystem 2822 and a data storage subsystem 2824 in communication with the sensors, eye tracking subsystem 2810, display subsystem 2804, and/or other components through a communications subsystem 2826. The communications subsystem 2826 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2824 may include instructions stored thereon that are executable by logic subsystem 2822, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2800 is configured with one or more audio transducers 2828 (e.g., speakers, earphones, etc.) so that audio can be utilized as part of a mixed-reality or virtual-reality experience. A power management subsystem 2830 may include one or more batteries 2832 and/or protection circuit modules (PCMs) and an associated charger interface 2834 and/or remote power interface for supplying power to components in the HMD device 2800.

It may be appreciated that the HMD device 2800 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 30:
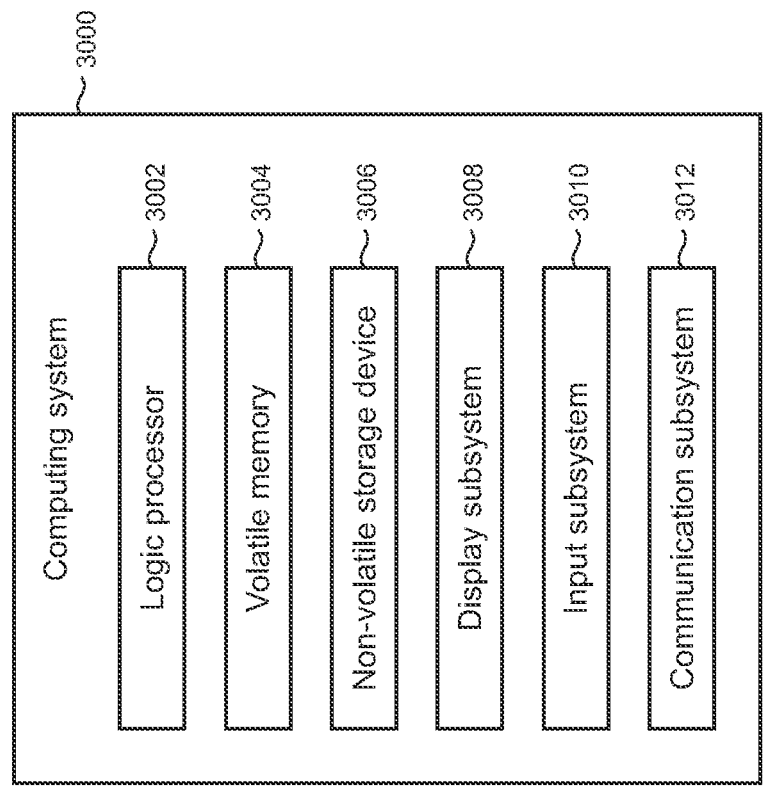
FIG. 30 shows a block diagram of an illustrative electronic device that incorporates a mixed-reality display system using the present waveguide combiner with stacked plates.

FIG. 30 schematically shows an illustrative example of a computing system 3000 that can enact one or more of the systems, features, functions, methods and/or processes described above for the present waveguide combiner with stacked plates. The computing system is shown in simplified form. The computing system may take the form of one or more personal computers, server computers, tablet computers, home-entertainment computers, network computing devices, gaming devices, mobile computing devices, mobile communication devices (e.g., smartphone), wearable computers, and/or other computing devices.

The computing system 3000 includes a logic processor 3002, a volatile memory 3004, and a non-volatile storage device 3006. The computing system may optionally include a display subsystem 3008, input subsystem 3010, communication subsystem 3012, and/or other components not shown in FIG. 30.

The logic processor 3002 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 3002 includes one or more processors configured to execute software instructions. In addition, or alternatively, the logic processor includes one or more hardware or firmware logic processors configured to execute hardware or firmware instructions. Processors of the logic processor may be single-core or multi-core, and the instructions executed thereon are configurable for sequential, parallel, and/or distributed processing. Individual components of the logic processor are optionally distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines.

The non-volatile storage device 3006 includes one or more physical devices configured to hold instructions executable by the logic processors to implement the methods and processes described herein. When such methods and processes are implemented, the state of non-volatile storage device may be transformed—e.g., to hold different data.

The non-volatile storage device 3006 may include physical devices that are removable and/or built-in. Non-volatile storage device may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. The non-volatile storage device may include nonvolatile, dynamic, static, read/write, read-only, sequential-access, location-addressable, file-addressable, and/or content-addressable devices. It will be appreciated that non-volatile storage device is configured to hold instructions even when power is cut to the non-volatile storage device.

The volatile memory 3004 may include physical devices that include random access memory. The volatile memory is typically utilized by the logic processor 3002 to temporarily store information during processing of software instructions. It will be appreciated that the volatile memory typically does not continue to store instructions when power is cut to the volatile memory.

Aspects of logic processor 3002, volatile memory 3004, and non-volatile storage device 3006 are capable of integration into one or more hardware-logic components. Such hardware-logic components include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" is typically used to describe an aspect of computing system 3000 implemented in software by a processor to perform a particular function using portions of volatile memory, which function involves transformative processing that specially configures the processor to perform the function. Thus, a program may be instantiated via the logic processor 3002 executing instructions held by the non-volatile storage device 3006, using portions of the volatile memory 3004. It will be understood that different programs may be instantiated from the same application, service, code block, object, library, routine, API (application programming interface), function, etc. Likewise, the same program may be instantiated by different applications, services, code blocks, objects, routines, APIs, functions, etc. A program may encompass individual or groups of executable files, data files, libraries, drivers, scripts, database records, etc.

When included, the display subsystem 3008 may be used to present a visual representation of data held by the non-volatile storage device 3006. This visual representation may take the form of a graphical user interface (GUI). As the herein described methods and processes change the data held by the non-volatile storage device, and thus transform the state of the non-volatile storage device, the state of the display subsystem 3008 is likewise transformed to visually represent changes in the underlying data. The display subsystem may include one or more display devices utilizing virtually any type of technology; however, one utilizing a MEMS projector to direct laser light may be compatible with the eye-tracking system in a compact manner. Such display devices may be combined with the logic processor 3002, volatile memory 3004, and/or non-volatile storage device 3006 in a shared enclosure, or such display devices may be peripheral display devices.

When included, the input subsystem 3010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 3012 may be configured to communicatively couple various computing devices described herein with each other, and with other devices. Communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 3000 to send and/or receive messages to and/or from other devices via a network such as the Internet.

Various exemplary embodiments of the present waveguide combiner with stacked plates are now presented by way of illustration and not as an exhaustive list of all embodiments. An example includes a waveguide combiner having a plurality of plates arranged in a stack usable in a mixed-reality environment including views of a real world combined with images of virtual objects from a virtual world, comprising: a see-through waveguide forming a bottom plate in the stack through which the real world is viewable by a user of the waveguide combiner; a top plate in the stack, the top plate including an input coupler and a top reflective optical element (ROE); a bottom ROE included with the bottom plate, in which the top ROE and the bottom ROE have footprints with a common shape and size, the footprints being aligned in the stack; and an output coupler included with the bottom plate, wherein the top ROE receives virtual image light having an entrance pupil from the input coupler, expands the virtual image light to provide one-dimensional exit pupil expansion in a first direction, and couples the virtual image light to the bottom ROE, wherein the bottom ROE receives the virtual image light from the top ROE and couples the virtual image light to the output coupler, and wherein the output coupler receives the virtual image light from the bottom ROE, expands the virtual image light to provide one-dimensional exit pupil expansion in a second direction that is orthogonal to the first direction, and out-couples the virtual image light to an eye of the user with an expanded exit pupil in the first and second directions relative to the entrance pupil.

In another example, one or more of the ROEs comprise a plurality of mutually-parallel reflecting internal surfaces arranged in a cascade to progressively reflect light propagating within a plate in the stack. In another example, the input coupler is disposed transversely in the top plate relative to the top ROE, and the input coupler comprises a prism, ROE, diffractive optical element, or holographic optical element. In another example, the top plate further comprises a waveguide and the virtual images are in-coupled at the input coupler and propagate through total internal reflection in the waveguide to the top ROE in the top plate. In another example, the output coupler comprises an out-coupling ROE disposed transversely in the bottom plate relative to the bottom ROE, and virtual image light is coupled by the bottom ROE to the see-through waveguide and propagates through total internal reflection to the out-coupling ROE. In another example, one or more of the out-coupling ROE, top ROE, or bottom ROE comprise a stack of glass plates, one or more of the plates including a partial mirror so that the stack functions as a beam splitter. In another example, one or more of the out-coupling ROE, top ROE, or bottom ROE comprise a molded plastic microprism array.

A further example includes a head-mounted display (HMD) device wearable by a user and supporting a mixed-reality experience comprising a display of virtual images for objects in a virtual world and real-world images for objects in a real world, comprising: a display engine generating one or more optical beams for the virtual images; and a waveguide combiner comprising a stack of plates including a top plate and a bottom plate, wherein the top plate comprises a top waveguide, an input coupler disposed on the top waveguide, and a top reflective optical element (ROE) disposed on the top waveguide, and wherein the bottom plate includes a bottom waveguide, a bottom ROE disposed on the bottom waveguide and an output coupler disposed on the bottom waveguide, and wherein the top and bottom ROEs have a common shape and size and are axially aligned in the stack of plates, and wherein the one or more optical beams from the display engine are in-coupled by the input coupler into the waveguide combiner, propagated by the top waveguide to the top ROE, propagated in the top ROE with expanded exit pupil in a horizontal direction, coupled by the top ROE to the bottom ROE, propagated by the bottom waveguide to the output coupler, propagated in the output coupler with expanded exit pupil in a vertical direction, and out-coupled from the waveguide combiner to at least one eye of the user by the output coupler.

In another example, the bottom ROE and output coupler each comprise an array of mirrors that is tilted relative to a plane of the bottom plate. In another example, the HMD device further comprises a supplemental plate that is disposed in the stack of plates, the supplemental plate comprising one or more optical elements comprising one of polarizing filter, spectral filter, refractive optical element, diffractive optical element, holographic element, switchable holographic element, metasurface, prism, microprism array, microlens array, tunable microlens, resonant waveguide grating, microelectromechanical system (MEMS), or illumination source. In another example, the supplemental plate is disposed between the top plate and the bottom plate in the stack. In another example, the HMD device further comprises a second supplemental plate of one or more optical elements, the second supplemental plate being disposed between the top plate and the bottom plate in the stack or the supplemental plate and second supplemental plate are interleaved between the top plate and the bottom plate. In another example, the supplemental plate shares a common footprint with the top plate and the bottom plate and is axially aligned with each of the top plate and the bottom plate. In another example, the light for the virtual images has a full angular field of view (FOV) comprising a first partial FOV and a second partial FOV and in which the top ROE propagates virtual image light for the first partial FOV and the bottom ROE propagates virtual image light for the second partial FOV, wherein the first partial FOV and the second partial FOV are each unique angular portions of the full angular FOV. In another example, the bottom ROE horizontally expands an exit pupil for virtual image light for the second partial FOV. In another example, the top ROE provides exit pupil expansion in the horizontal direction and partial exit pupil expansion in the vertical direction.

A further example includes a method for fabricating a waveguide combiner with stacked plates, the waveguide combiner utilizable in a mixed-reality environment in which virtual images are mixed with real-world images, comprising: cutting a plurality of blanks from a sheet of planar transparent optical substrate, wherein each blank has a commonly shared shape and size, and each blank has a partially-reflecting coating disposed over at least a portion of at least one planar surface; bonding the plurality of blanks to form one or more sets of stacked blanks; cutting the one or more sets of the stacked blanks along a set of parallel cutting planes at a first angle to form a first reflective optical element (ROE) having a set of cascaded mirror elements formed from the partially-reflecting coating disposed on the at least one planar surface of each of the blanks; cutting the one or more sets of the stacked blanks along a set of parallel cutting planes at a second angle that is different from the first angle to form a second ROE having a set of cascaded mirror elements formed from the partially-reflecting coating disposed on the at least one planar surface of each of the blanks; bonding the first ROE to a first waveguide to create a top plate of the waveguide combiner, the top plate further comprising an input coupler configured for in-coupling the virtual images to the waveguide combiner; bonding the second ROE to a second waveguide to create a bottom plate of the waveguide combiner, the bottom plate further comprising an out-coupling ROE configured for one-dimensional expansion of an exit pupil of the virtual images in a first direction and out-coupling the virtual images from the waveguide combiner; and assembling the top and bottom plates in a stack to form the waveguide combiner, wherein the first ROE in the top plate is configured for one-dimensional expansion of the exit pupil and coupling the virtual image light to the second ROE in the bottom plate, and wherein the second ROE in the bottom plate is configured to couple the virtual image light to the out-coupling ROE.

In another example, the method further comprises one or more steps of cutting, grinding, or polishing one or more surfaces of the blanks. In another example, the method further comprises applying the partially-reflecting coating to at least a portion of a sheet of planar transparent optical substrate or to at least a portion of the at least one planar surface of each of the plurality of blanks, wherein the partially-reflecting coating comprises a thin film applied using chemical or vapor deposition. In another example, the thin film comprises a plurality of layered dielectric materials, in which two or more of the layers comprise different dielectric materials.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A waveguide combiner having a plurality of plates arranged in a stack usable in a mixed-reality environment including views of a real world combined with images of virtual objects from a virtual world, comprising:
    a see-through waveguide forming a bottom plate in the stack through which the real world is viewable by a user of the waveguide combiner;
    a top plate in the stack, the top plate including an input coupler and a top reflective optical element (ROE);
    a bottom ROE included with the bottom plate, in which the top ROE and the bottom ROE have footprints with a common shape and size, the footprints being aligned in the stack; and
    an output coupler included with the bottom plate,
    wherein the top ROE receives virtual image light having an entrance pupil from the input coupler, expands the virtual image light to provide one-dimensional exit pupil expansion in a first direction, and couples the virtual image light to the bottom ROE,
    wherein the bottom ROE receives the virtual image light from the top ROE and couples the virtual image light to the output coupler, and
    wherein the output coupler receives the virtual image light from the bottom ROE, expands the virtual image light to provide one-dimensional exit pupil expansion in a second direction that is orthogonal to the first direction, and out-couples the virtual image light to an eye of the user with an expanded exit pupil in the first and second directions relative to the entrance pupil.

2. The waveguide combiner of claim 1 in which one or more of the ROEs comprise a plurality of mutually-parallel reflecting internal surfaces arranged in a cascade to progressively reflect light propagating within a plate in the stack.

3. The waveguide combiner of claim 1 in which the input coupler is disposed transversely in the top plate relative to the top ROE, and in which the input coupler comprises a prism, ROE, diffractive optical element, or holographic optical element.

4. The waveguide combiner of claim 1 in which the top plate further comprises a waveguide and the virtual images are in-coupled at the input coupler and propagate through total internal reflection in the waveguide to the top ROE in the top plate.

5. The waveguide combiner of claim 1 in which the output coupler comprises an out-coupling ROE disposed transversely in the bottom plate relative to the bottom ROE, and in which virtual image light is coupled by the bottom ROE to the see-through waveguide and propagates through total internal reflection to the out-coupling ROE.

6. The waveguide combiner of claim 5 in which one or more of the out-coupling ROE, top ROE, or bottom ROE comprise a stack of glass plates, one or more of the plates including a partial mirror so that the stack functions as a beam splitter.

7. The waveguide combiner of claim 5 in which one or more of the out-coupling ROE, top ROE, or bottom ROE comprise a molded plastic microprism array.

8. A head-mounted display (HMD) device wearable by a user and supporting a mixed-reality experience comprising a display of virtual images for objects in a virtual world and real-world images for objects in a real world, comprising:
    a display engine generating one or more optical beams for the virtual images; and
    a waveguide combiner comprising a stack of plates including a top plate and a bottom plate,
        wherein the top plate comprises a top waveguide, an input coupler disposed on the top waveguide, and a top reflective optical element (ROE) disposed on the top waveguide, and
        wherein the bottom plate includes a bottom waveguide, a bottom ROE disposed on the bottom waveguide and an output coupler disposed on the bottom waveguide, and
        wherein the top and bottom ROEs have a common shape and size and are axially aligned in the stack of plates, and
        wherein the one or more optical beams from the display engine are in-coupled by the input coupler into the waveguide combiner, propagated by the top waveguide to the top ROE, propagated in the top ROE with expanded exit pupil in a horizontal direction, coupled by the top ROE to the bottom ROE, propagated by the bottom waveguide to the output coupler, propagated in the output coupler with expanded exit pupil in a vertical direction, and out-coupled from the waveguide combiner to at least one eye of the user by the output coupler.

9. The HMD device of claim 8 in which the bottom ROE and output coupler each comprise an array of mirrors that is tilted relative to a plane of the bottom plate.

10. The HMD device of claim 8 further comprising a supplemental plate that is disposed in the stack of plates, the supplemental plate comprising one or more optical elements comprising one of polarizing filter, spectral filter, refractive optical element, diffractive optical element, holographic element, switchable holographic element, metasurface, prism, microprism array, microlens array, tunable microlens, resonant waveguide grating, microelectromechanical system (MEMS), or illumination source.

11. The HMD device of claim 10 in which the supplemental plate is disposed between the top plate and the bottom plate in the stack.

12. The HMD device of claim 10 further comprising a second supplemental plate of one or more optical elements, the second supplemental plate being disposed between the top plate and the bottom plate in the stack or in which the supplemental plate and second supplemental plate are interleaved between the top plate and the bottom plate.

13. The HMD device of claim 11 in which the supplemental plate shares a common footprint with the top plate and the bottom plate and is axially aligned with each of the top plate and the bottom plate.

14. The HMD device of claim 8 in which the light for the virtual images has a full angular field of view (FOV) comprising a first partial FOV and a second partial FOV and in which the top ROE propagates virtual image light for the first partial FOV and the bottom ROE propagates virtual image light for the second partial FOV, wherein the first partial FOV and the second partial FOV are each unique angular portions of the full angular FOV.

15. The HMD device of claim 14 in which the bottom ROE horizontally expands an exit pupil for virtual image light for the second partial FOV.

16. The HMD device of claim 8 in which the top ROE provides exit pupil expansion in the horizontal direction and partial exit pupil expansion in the vertical direction.

17. A method for fabricating a waveguide combiner with stacked plates, the waveguide combiner utilizable in a mixed-reality environment in which virtual images are mixed with real-world images, comprising:
cutting a plurality of blanks from a sheet of planar transparent optical substrate, wherein each blank has a commonly shared shape and size, and each blank has a partially-reflecting coating disposed over at least a portion of at least one planar surface;
bonding the plurality of blanks to form one or more sets of stacked blanks;
cutting the one or more sets of the stacked blanks along a set of parallel cutting planes at a first angle to form a first reflective optical element (ROE) having a set of cascaded mirror elements formed from the partially-reflecting coating disposed on the at least one planar surface of each of the blanks;
cutting the one or more sets of the stacked blanks along a set of parallel cutting planes at a second angle that is different from the first angle to form a second ROE having a set of cascaded mirror elements formed from the partially-reflecting coating disposed on the at least one planar surface of each of the blanks;
bonding the first ROE to a first waveguide to create a top plate of the waveguide combiner, the top plate further comprising an input coupler configured for in-coupling the virtual images to the waveguide combiner;
bonding the second ROE to a second waveguide to create a bottom plate of the waveguide combiner, the bottom plate further comprising an out-coupling ROE configured for one-dimensional expansion of an exit pupil of the virtual images in a first direction and out-coupling the virtual images from the waveguide combiner; and
assembling the top and bottom plates in a stack to form the waveguide combiner, wherein the first ROE in the top plate is configured for one-dimensional expansion of the exit pupil and coupling the virtual image light to the second ROE in the bottom plate, and wherein the second ROE in the bottom plate is configured to couple the virtual image light to the out-coupling ROE.

18. The method of claim 17 further comprising one or more steps of cutting, grinding, or polishing one or more surfaces of the blanks.

19. The method of claim 17 further comprising applying the partially-reflecting coating to at least a portion of a sheet of planar transparent optical substrate or to at least a portion of the at least one planar surface of each of the plurality of blanks, wherein the partially-reflecting coating comprises a thin film applied using chemical or vapor deposition.

20. The method of claim 19 in which the thin film comprises a plurality of layered dielectric materials, in which two or more of the layers comprise different dielectric materials.

* * * * *